(12) United States Patent
Tsai

(10) Patent No.: US 9,019,637 B2
(45) Date of Patent: Apr. 28, 2015

(54) PLASTIC LENS BARREL AND METHOD FOR MANUFACTURING THE SAME

(71) Applicant: Largan Precision Co., Ltd., Taichung (TW)

(72) Inventor: Chun-Hua Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 129 days.

(21) Appl. No.: 13/711,536

(22) Filed: Dec. 11, 2012

(65) Prior Publication Data

US 2014/0133040 A1     May 15, 2014

Related U.S. Application Data

(60) Provisional application No. 61/725,488, filed on Nov. 13, 2012.

(51) Int. Cl.
    *G02B 7/02*     (2006.01)

(52) U.S. Cl.
    CPC ........................................ *G02B 7/02* (2013.01)

(58) Field of Classification Search
    CPC ........................................................ G02B 7/02
    USPC ................ 359/703, 704, 819; 264/328.8, 478
    See application file for complete search history.

(56) References Cited

FOREIGN PATENT DOCUMENTS

JP             08-194146      *    7/1996               G02B 7/02

* cited by examiner

*Primary Examiner* — Joseph P Martinez
(74) *Attorney, Agent, or Firm* — CKC & Partners Co., Ltd.

(57) ABSTRACT

A plastic lens barrel and method for manufacturing the plastic lens barrel are provided. The plastic lens barrel includes a front portion, a rear portion, a side portion, and at least three gate vestiges formed on at least one of the front portion, the rear portion, and the side portion. The front portion has a front opening. The rear portion has a rear opening. The side portion connects the front portion and the rear portion. An outermost diameter of the plastic lens barrel is Dmax and Dmax<10 mm. The method for manufacturing the plastic lens barrel by injection molding with a plurality of injection channels includes the steps of providing an injection mold of a plastic lens barrel structure having at least three injection channels and injecting a molding material into the injection mold through the injection channels to obtain the plastic lens barrel.

27 Claims, 21 Drawing Sheets

```
┌─────────────────────────┐
│ An injection mold of a plastic │
│ lens barrel structure with at least │──── 1010
│ three injection channels is │
│ provided │
└─────────────────────────┘
            ⇓
┌─────────────────────────┐
│ A molding material is injected │
│ into the injection mold through │──── 1020
│ the injection channels to obtain │
│ the plastic lens barrel │
└─────────────────────────┘
```

Fig. 10

PLASTIC LENS BARREL AND METHOD FOR MANUFACTURING THE SAME

RELATED APPLICATIONS

The application claims priority to U.S. Provisional Patent Application No. 61/725,488, filed Nov. 13, 2012, which is herein incorporated by reference.

BACKGROUND

1. Field of Invention

The present disclosure relates to a lens barrel. More particularly, the present disclosure relates to a plastic lens barrel applicable to compact image capturing units and a method for manufacturing the plastic lens barrel.

2. Description of Related Art

Portable and personal electronic devices with an image capturing unit such as a smartphone and a tablet have been gaining popularity over the years, and the demand of camera lenses on these devices is therefore increasing. In accordance to the miniaturization of these products and devices, camera lenses thereon need to be more compact. Generally, lens barrels for the compact camera lenses are made by plastic injection molding. However, conventional plastic lens barrels are manufactured by an injection molding machine with only one gate that is unable to ensure the stability of high quality of the molded products. By using the single-gate injection molding process, the local stress concentration, uneven material distribution, and low structural strength will translate into the low build quality of the conventional plastic lens barrels.

SUMMARY

According to one aspect of the present disclosure, a plastic lens barrel includes a front portion, a rear portion, a side portion, and at least three gate vestiges formed on at least one of the front portion, the rear portion, and the side portion. The front portion has a front opening. The rear portion has a rear opening. The side portion connects the front portion and the rear portion. An outermost diameter of the plastic lens barrel is Dmax and the following relationship is satisfied:

$Dmax < 10$ mm.

According to another aspect of the present disclosure, a method for manufacturing a plastic lens barrel by injection molding with a plurality of injection channels includes the following steps. An injection mold of a plastic lens barrel structure with at least three injection channels is provided. A molding material is injected into the injection mold through the injection channels to obtain the plastic lens barrel, wherein the plastic lens barrel includes a front portion having a front opening, a rear portion having a rear opening, a side portion connecting the front portion and the rear portion, and at least three gate vestiges formed on at least one of the front portion, the rear portion, and the side portion. Moreover, each of the gate vestiges corresponds to each of the injection channels, an outermost diameter of the plastic lens barrel is Dmax, a diameter of the front opening is Df, and a diameter of the rear opening is Dr, the following relationship is satisfied:

$Dmax < 10$ mm; and $0.1 < Df/Dr < 0.5$.

BRIEF DESCRIPTION OF THE DRAWINGS

The disclosure can be more fully understood by reading the following detailed description of the embodiment, with reference made to the accompanying drawings as follows:

FIG. 10 is a flowchart illustrating a method for manufacturing the plastic lens barrel by injection molding with a plurality of injection channels according to the present disclosure;

DETAILED DESCRIPTION

Figure 1A:
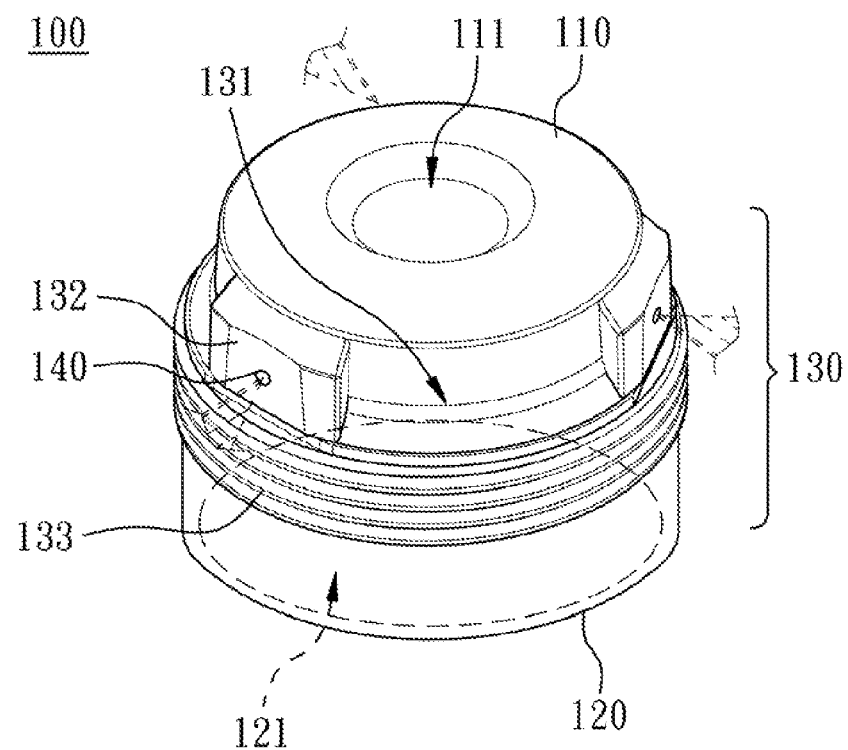
FIG. 1A is a schematic view of a plastic lens barrel according to the 1st embodiment of the present disclosure.

A plastic lens barrel includes a front portion, a rear portion, a side portion, and at least three gate vestiges formed on at least one of the front portion, the rear portion, and the side portion. The front portion has a front opening. The rear portion has a rear opening. The side portion connects the front portion and the rear portion. An outermost diameter of the plastic lens barrel is Dmax and the following relationship is satisfied: Dmax<10 mm. Thus, the thickness of the plastic lens barrel is proper that prevents breakage from the insufficient thickness or contraction from the excessive thickness. Specifically, the structural strength and symmetry of the plastic lens barrel will be improved.

The gate vestiges are symmetrically formed on the plastic lens barrel around a central axis of the plastic lens barrel. Thus, the stress within the plastic lens barrel during injection molding process can be more evenly distributed, and the plastic lens barrel will be higher in terms of homogeneity.

The gate vestiges are symmetrically formed on the side portion and closer to the front portion than to the rear portion. Thus, structural uniformity of the plastic lens barrel is improved and the arrangement of other functional elements of the plastic lens barrel will not be affected.

The side portion includes at least three planar cut surfaces and each of the gate vestiges corresponds to each of the planar cut surfaces. Thus, the interference of the gate vestiges at the side portion of the plastic lens barrel against other optical components during assembling into a larger optical lens system can be prevented.

A height of the plastic lens barrel is Z, and the outermost diameter of the plastic lens barrel is Dmax, the following relationship is satisfied: 0.3<Z/Dmax<0.8. Thus, the volume of the plastic lens barrel can be minimized while maintaining sufficient practicality, in order to meet the popular trend of being compact, light-weight and thin. Preferably for similar functional advantages, the plastic lens barrel also satisfies the following relationship: Z<5 mm.

A diameter of the front opening is Df, and a diameter of the rear opening is Dr, the following relationship is satisfied: 0.1<Df/Dr<0.5. Thus, the structural strength of the plastic lens barrel can be improved at both front portion and the rear portion of the plastic lens barrel due to higher homogeneity of the plastic material within.

A first thickness of the plastic lens barrel near one of the gate vestiges is Tg, and a second thickness of the plastic barrel near the rear portion is Tr, the following relationship is satisfied: 2.0<Tg/Tr<7.5. Thus, no undesirable air bubble will be generated in molding material such as melted plastic material due to high injection pressure at the gate of the injection channel during injection molding, and the structural strength of the plastic lens barrel is improved.

The side portion includes a plurality of indentations and a thread structure thereon. The indentations along with the thread structure are formed thereon around the central axis of the plastic lens barrel and can be utilized in the automated assembly and optical calibration process in producing compact camera lens modules.

A method for manufacturing the plastic lens barrel by injection molding with a plurality of injection channels includes the following steps. An injection mold of a plastic lens barrel structure with at least three injection channels is provided. A molding material is injected into the injection mold through the injection channels to obtain the plastic lens barrel, wherein each of the gate vestiges corresponds to each of the injection channels. Thus, the plastic lens barrel of this instant article has overcome many deficiencies of the conventional plastic lens barrels manufactured with only one gate.

According to the above description of the present disclosure, the following embodiments are provided for further explanation.

1st Embodiment

Figure 1B:
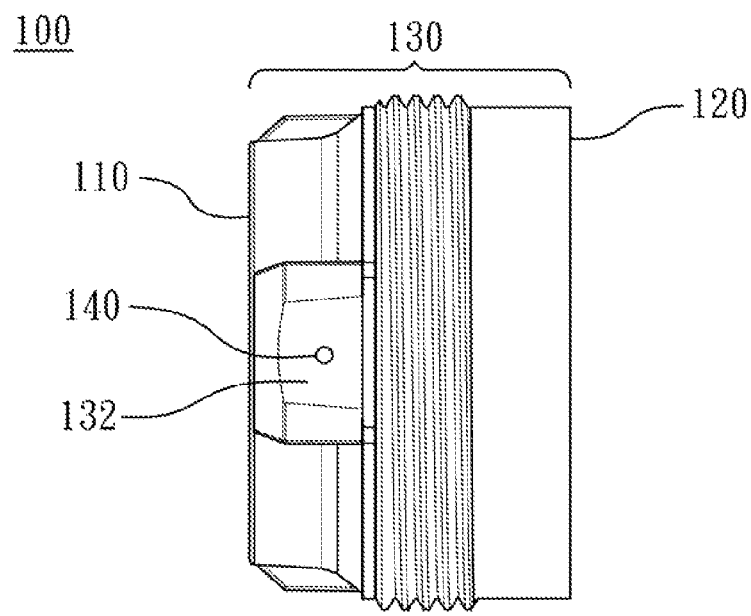
FIG. 1B is a side view of the plastic lens barrel shown in FIG. 1A.

FIG. 1A is a schematic view of a plastic lens barrel according to the 1st embodiment of the present disclosure. FIG. 1B is a side view of the plastic lens barrel shown in FIG. 1A.

In FIG. 1A and FIG. 1B, the plastic lens barrel 100 includes a front portion 110, a rear portion 120, a side portion 130, and three gate vestiges 140. The plastic lens barrel 100 is integrally formed. The front portion 110 and the rear portion 120 are located at two ends of the plastic lens barrel 100, respectively. The side portion 130 connects the front portion 110 and the rear portion 120. The gate vestiges 140 are formed on at least one of the front portion 110, the rear portion 120, and the side portion 130. Specifically, the gate vestiges 140 are formed on the side portion 130 and closer to the front portion 110 than to the rear portion 120. The front portion 110 has a front opening 111, and the rear portion 120 has a rear opening 121. The side portion 130 includes three indentations 131, three planar cut surfaces 132, and a thread structure 133 thereon. The plastic lens barrel 100 can be utilized in mobile devices.

Figure 1C:
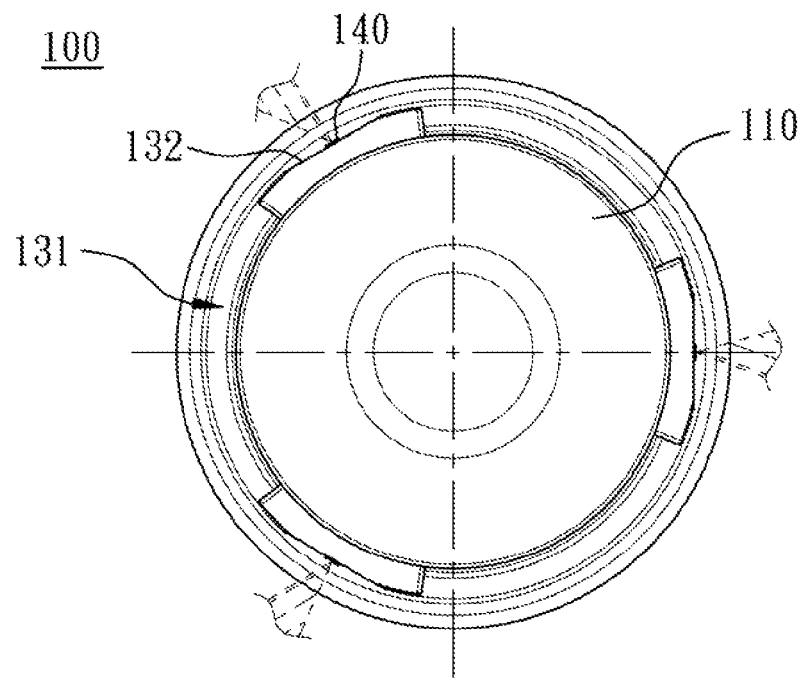
FIG. 1C is a top view of the plastic lens barrel shown in FIG. 1A.

FIG. 1C is a top view of the plastic lens barrel shown in FIG. 1A. In FIG. 1C, the gate vestiges 140 are symmetrically formed around a central axis X' (referring to FIG. 1D) of the plastic lens barrel 100. Each of the gate vestiges 140 is formed separately on one of the planar cut surfaces 132. Specifically, each of the planar cut surfaces 132 corresponds to each of the gate vestiges 140 and the gate vestiges 140 are formed on the planar cut surfaces 132. The indentations 131 along with the thread structure 133 are also symmetrically formed around the central axis X' of the plastic lens barrel 100. Specifically, the gate vestiges 140 and the indentations 131 are alliteratively arranged around the central axis X' of the plastic lens barrel 100.

Figure 1D:
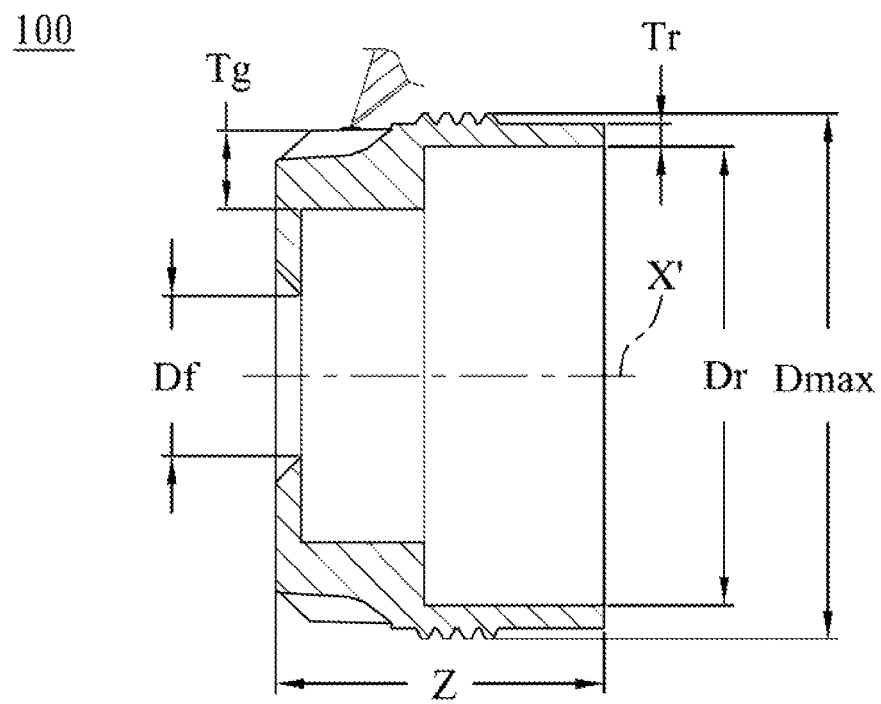
FIG. 1D is a sectional view of the plastic lens barrel shown in FIG. 1A.

FIG. 1D is a sectional view of the plastic lens barrel shown in FIG. 1A. In FIG. 1D, an outermost diameter of the plastic lens barrel 100 is Dmax, a height of the plastic lens barrel 100 is Z, a diameter of the front opening 111 is Df, a diameter of the rear opening 121 is Dr, a first thickness of the plastic lens barrel near one of the gate vestiges 140 is Tg, and a second thickness of the plastic lens barrel near the rear portion 120 is Tr. Specifically, Tg is a distance perpendicular to the central axis X' from an outer edge of one of the gate vestiges 140 to an inner surface of the plastic lens barrel 100 opposite to the outer edge. Tr is a distance perpendicular to the central axis X' from an outer boundary between the rear portion 120 and the side portion 130 to an inner surface of the plastic lens barrel

100 opposite to the outer boundary. Dmax, Df, Dr, Z, Tg, Tr, Z/Dmax, Df/Dr and Tg/Tr of the 1st embodiment are shown in Table 1 and Table 2.

TABLE 1

1st Embodiment (unit: mm)

| Dmax | Df | Dr | Z | Tg | Tr |
|---|---|---|---|---|---|
| 8.2 | 1.85 | 5.35 | 4.1 | 0.92 | 0.26 |

TABLE 2

| Z/Dmax | Df/Dr | Tg/Tr |
|---|---|---|
| 0.661 | 0.346 | 3.538 |

2nd Embodiment

Figure 2A:
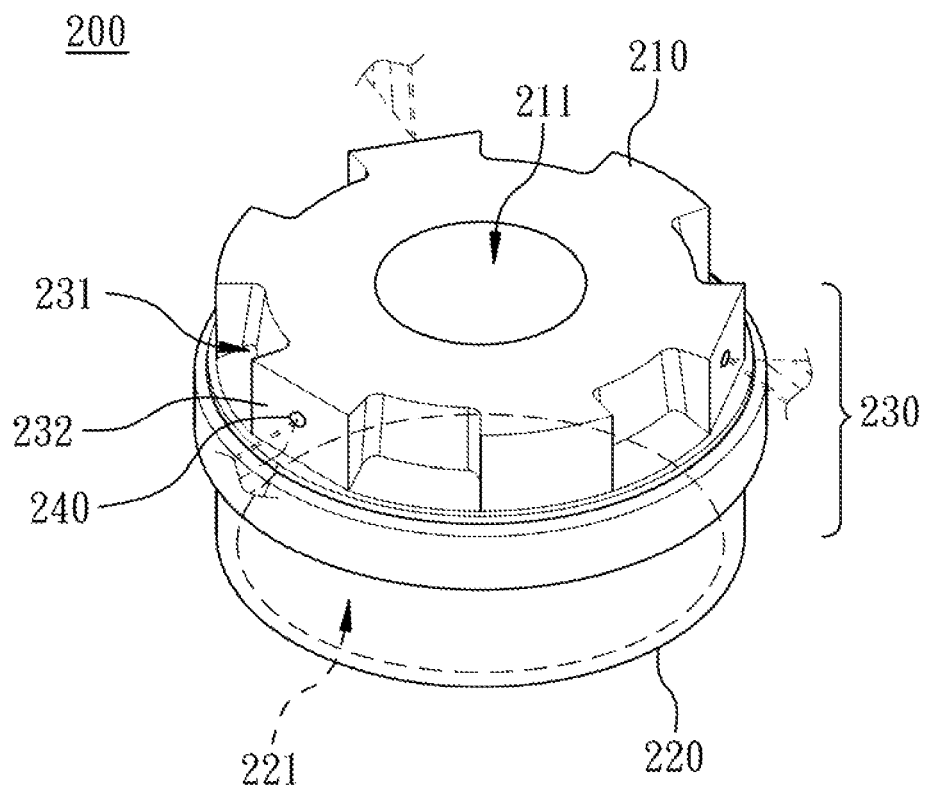
FIG. 2A is a schematic view of a plastic lens barrel according to the 2nd embodiment of the present disclosure.
Figure 2B:
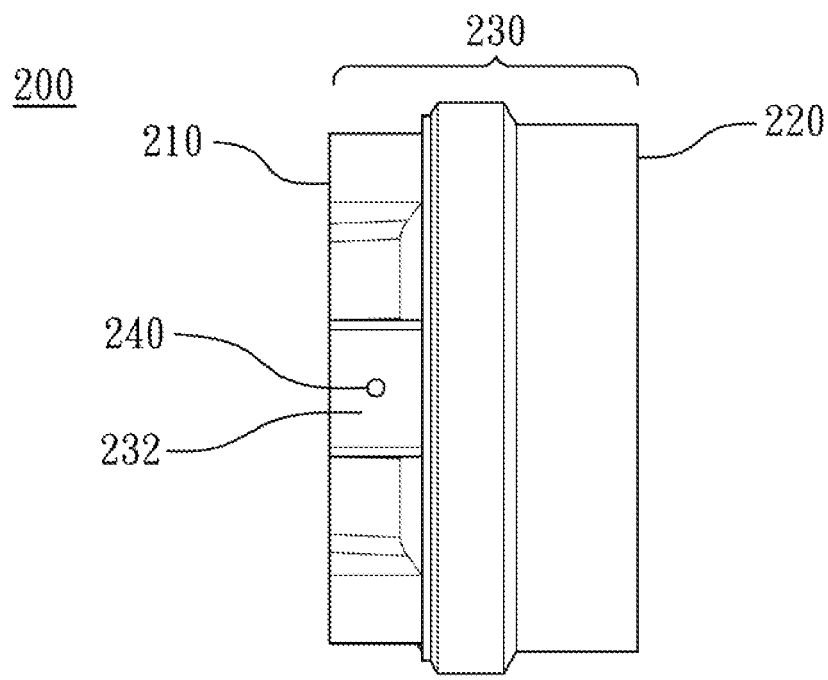
FIG. 2B is a side view of the plastic lens barrel shown in FIG. 2A.

FIG. 2A is a schematic view of a plastic lens barrel according to the 2nd embodiment of the present disclosure. FIG. 2B is a side view of the plastic lens barrel shown in FIG. 2A.

In FIG. 2A and FIG. 2B, the plastic lens barrel 200 includes a front portion 210, a rear portion 220, a side portion 230, and three gate vestiges 240. The plastic lens barrel 200 is integrally formed. The front portion 210 and the rear portion 220 are located at two ends of the plastic lens barrel 200, respectively. The side portion 230 connects the front portion 210 and the rear portion 220. The gate vestiges 240 are formed on at least one of the front portion 210, the rear portion 220, and the side portion 230. Specifically, the gate vestiges 240 are formed on the side portion 230 and closer to the front portion 210 than to the rear portion 220. The front portion 210 has a front opening 211, and the rear portion 220 has a rear opening 221. The side portion 230 includes six indentations 231, and three planar cut surfaces 232. The plastic lens barrel 200 can be utilized in mobile devices.

Figure 2C:
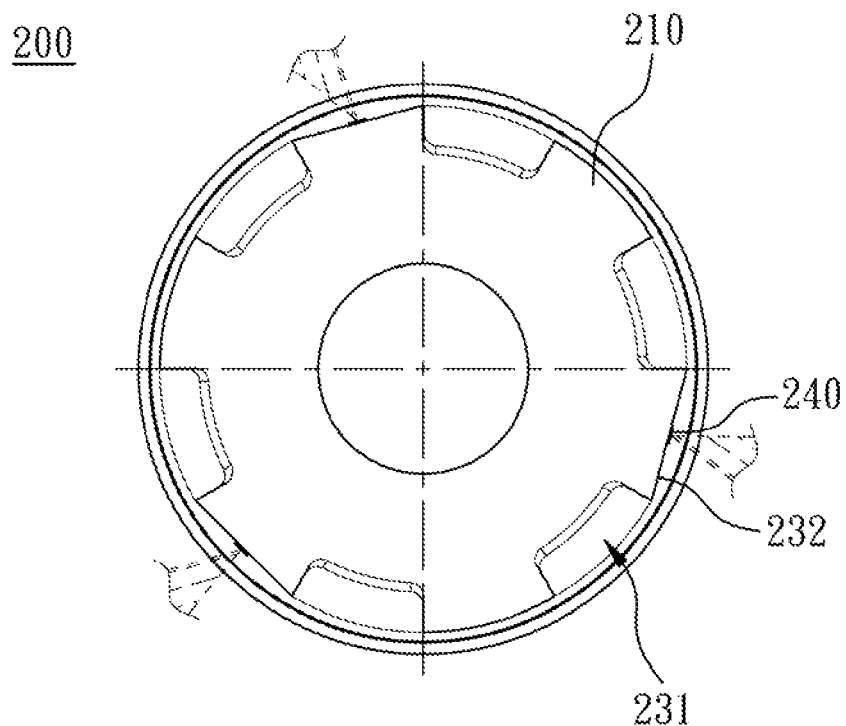
FIG. 2C is a top view of the plastic lens barrel shown in FIG. 2A.

FIG. 2C is a top view of the plastic lens barrel shown in FIG. 2A. In FIG. 2C, the gate vestiges 240 are symmetrically formed around a central axis X' (referring to FIG. 2D) of the plastic lens barrel 200. Each of the gate vestiges 240 is formed separately on one of the planar cut surfaces 232. Specifically, each of the planar cut surfaces 232 corresponds to each of the gate vestiges 240 and the gate vestiges 240 are formed on the planar cut surfaces 232. The indentations 231 are also symmetrically formed around the central axis X' of the plastic lens barrel 200. The gate vestiges 240 and the indentations 231 are regularly and alternatively arranged around the central axis X' of the plastic lens barrel 200.

Figure 2D:
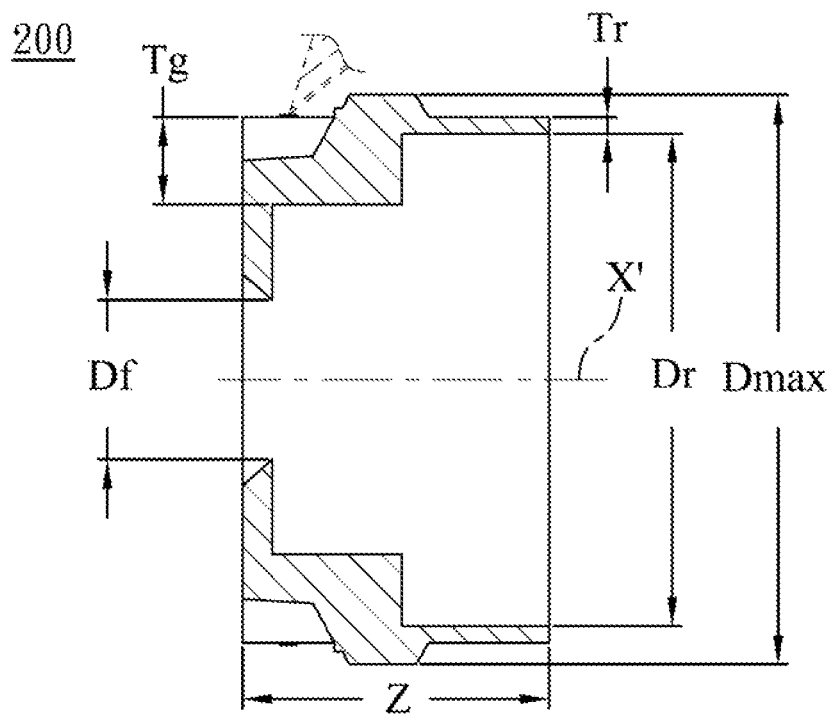
FIG. 2D is a sectional view of the plastic lens barrel shown in FIG. 2A.

FIG. 2D is a sectional view of the plastic lens barrel shown in FIG. 2A. In FIG. 2D, an outermost diameter of the plastic lens barrel 200 is Dmax, a height of the plastic lens barrel 200 is Z, a diameter of the front opening 211 is Df, a diameter of the rear opening 221 is Dr, a first thickness of the plastic lens barrel near one of the gate vestiges 240 is Tg, and a second thickness of the plastic lens barrel near the rear portion 220 is Tr. Specifically, Tg is a distance perpendicular to the central axis X' from an outer edge of one of the gate vestiges 240 to an inner surface of the plastic lens barrel 200 opposite to the outer edge. Tr is a distance perpendicular to the central axis X' from an outer boundary between the rear portion 220 and the side portion 230 to an inner surface of the plastic lens barrel 200 opposite to the outer boundary. Dmax, Df, Dr, Z, Tg, Tr, Z/Dmax, Df/Dr, and Tg/Tr of the 2nd embodiment are shown in Table 3 and Table 4.

TABLE 3

2nd Embodiment (unit: mm)

| Dmax | Df | Dr | Z | Tg | Tr |
|---|---|---|---|---|---|
| 6.5 | 1.82 | 5.5 | 3.5 | 1.0 | 0.19 |

TABLE 4

| Z/Dmax | Df/Dr | Tg/Tr |
|---|---|---|
| 0.538 | 0.331 | 5.263 |

3rd Embodiment

Figure 3A:
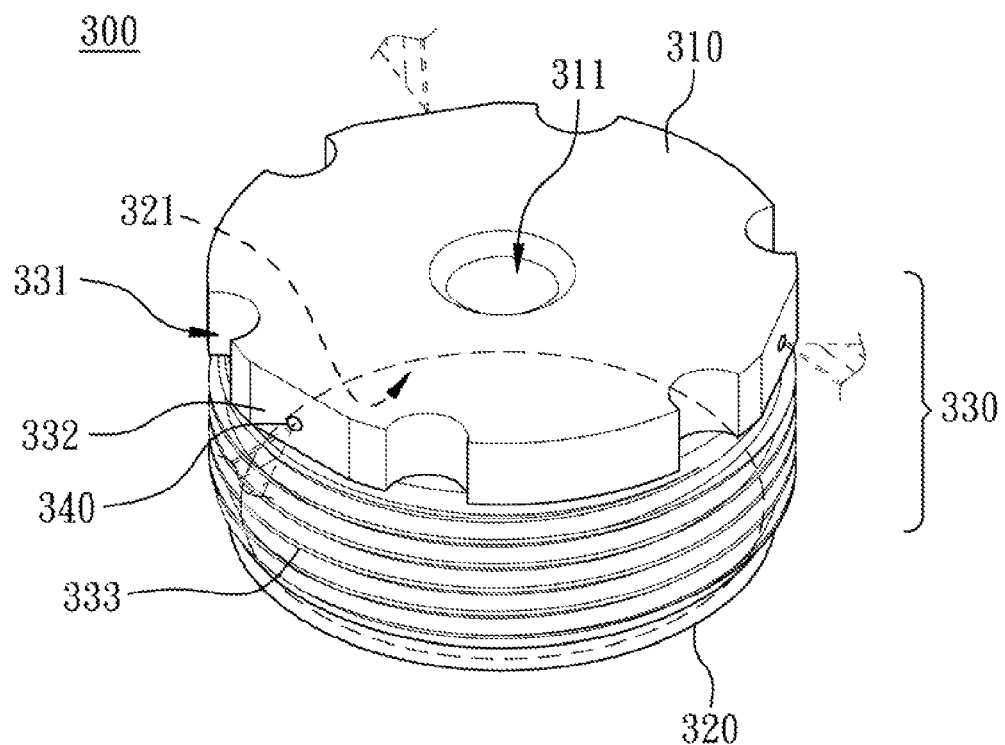
FIG. 3A is a schematic view of a plastic lens barrel according to the 3rd embodiment of the present disclosure.
Figure 3B:
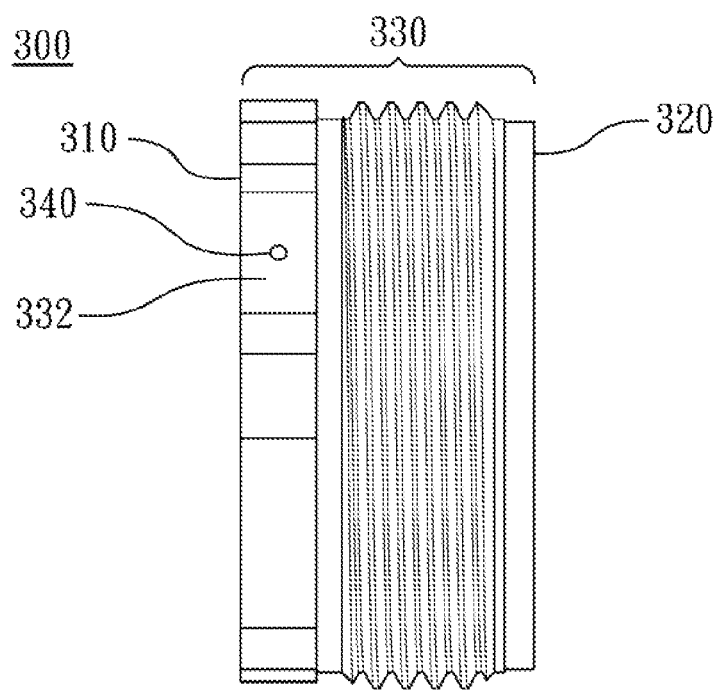
FIG. 3B is a side view of the plastic lens barrel shown in FIG. 3A.

FIG. 3A is a schematic view of a plastic lens barrel according to the 3rd embodiment of the present disclosure. FIG. 3B is a side view of the plastic lens barrel shown in FIG. 3A.

In FIG. 3A and FIG. 3B, the plastic lens barrel 300 includes a front portion 310, a rear portion 320, a side portion 330, and three gate vestiges 340. The plastic lens barrel 300 is integrally formed. The front portion 310 and the rear portion 320 are located at two ends of the plastic lens barrel 300, respectively. The side portion 330 connects the front portion 310 and the rear portion 320. The gate vestiges 340 are formed on at least one of the front portion 310, the rear portion 320, and the side portion 330. Specifically, the gate vestiges 340 are formed on the side portion 330 and closer to the front portion 310 than to the rear portion 320. The front portion 310 has a front opening 311, and the rear portion 320 has a rear opening 321. The side portion 330 includes six indentations 331, three planar cut surfaces 332, and a thread structure 333 thereon. The plastic lens barrel 300 can be utilized in mobile devices.

Figure 3C:
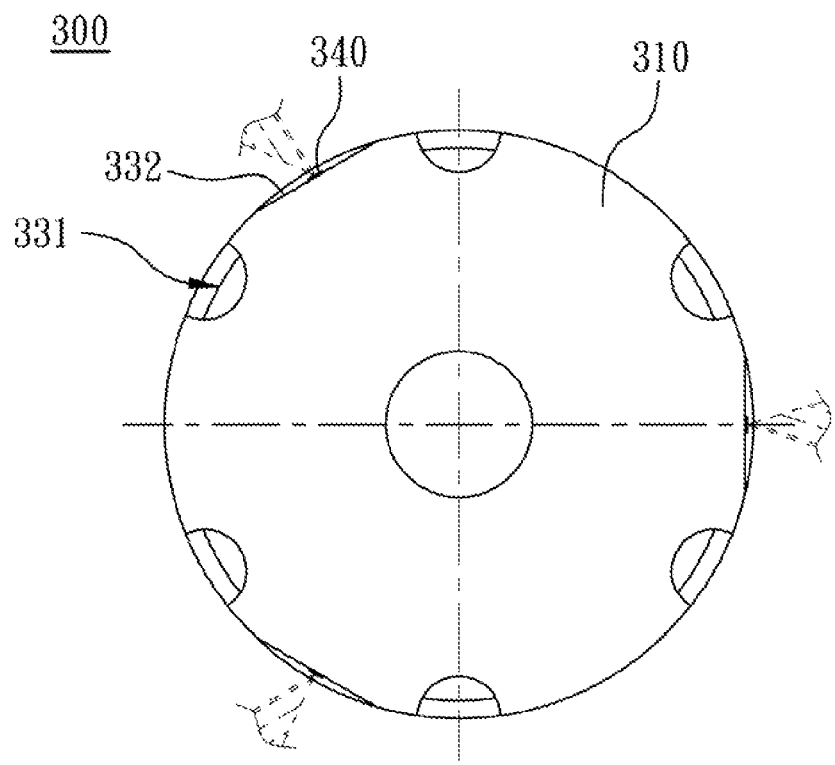
FIG. 3C is a top view of the plastic lens barrel shown in FIG. 3A.

FIG. 3C is a top view of the plastic lens barrel shown in FIG. 3A. In FIG. 3C, the gate vestiges 340 are symmetrically formed around a central axis X' (referring to FIG. 3D) of the plastic lens barrel 300. Each of the gate vestiges 340 is formed separately on one of the planar cut surfaces 332. Specifically, each of the planar cut surfaces 332 corresponds to each of the gate vestiges 340 and the gate vestiges 340 are formed on the planar cut surfaces 332. The indentations 331 along with the thread structure 333 are also symmetrically formed around the central axis X' of the plastic lens barrel 300. The gate vestiges 340 and the indentations 331 are regularly and alternatively arranged around the central axis X' of the plastic lens barrel 300.

Figure 3D:
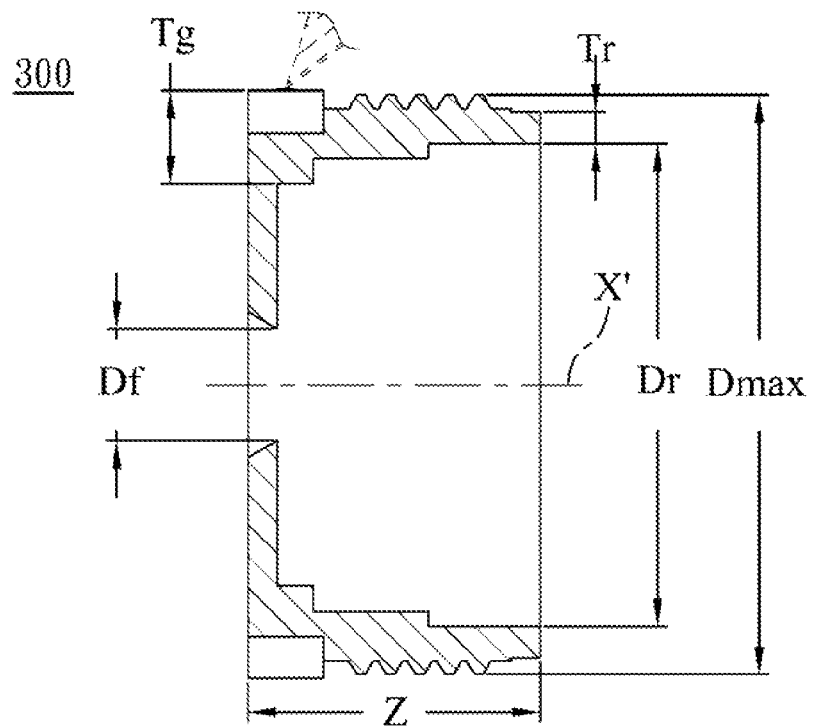
FIG. 3D is a sectional view of the plastic lens barrel shown in FIG. 3A.

FIG. 3D is a sectional view of the plastic lens barrel shown in FIG. 3A. In FIG. 3D, an outermost diameter of the plastic lens barrel 300 is Dmax, a height of the plastic lens barrel 300 is Z, a diameter of the front opening 311 is Df, a diameter of the rear opening 321 is Dr, a first thickness of the plastic lens barrel near one of the gate vestiges 340 is Tg, and a second thickness of the plastic lens barrel near the rear portion 320 is Tr. Specifically, Tg is a distance perpendicular to the central axis X' from an outer edge of one of the gate vestiges 340 to an inner surface of the plastic lens barrel 200 opposite to the outer edge. Tr is a distance perpendicular to the central axis X' from an outer boundary between the rear portion 320 and the side portion 330 to an inner surface of the plastic lens barrel 300 opposite to the outer boundary. Dmax, Df, Dr, Z, Tg, Tr, Z/Dmax, Df/Dr, and Tg/Tr of the 3rd embodiment are shown in Table 5 and Table 6.

TABLE 5

3rd Embodiment (unit: mm)

| Dmax | Df | Dr | Z | Tg | Tr |
|---|---|---|---|---|---|
| 7.0 | 1.33 | 5.7 | 3.5 | 1.1 | 0.38 |

TABLE 6

| Z/Dmax | Df/Dr | Tg/Tr |
|---|---|---|
| 0.500 | 0.233 | 2.895 |

TABLE 7

4th Embodiment (unit: mm)

| Dmax | Df | Dr | Z | Tg | Tr |
|---|---|---|---|---|---|
| 7.0 | 1.33 | 5.7 | 3.5 | 1.1 | 0.38 |

TABLE 8

| Z/Dmax | Df/Dr | Tg/Tr |
|---|---|---|
| 0.500 | 0.233 | 2.895 |

4th Embodiment

Figure 4A:
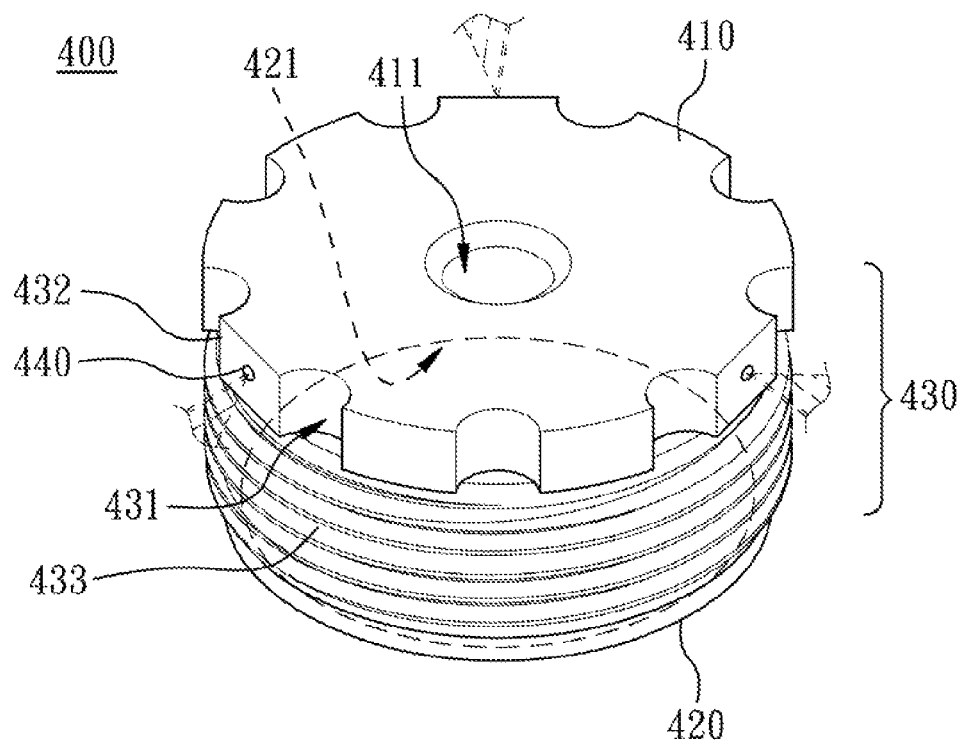
FIG. 4A is a schematic view of a plastic lens barrel according to the 4th embodiment of the present disclosure.
Figure 4B:
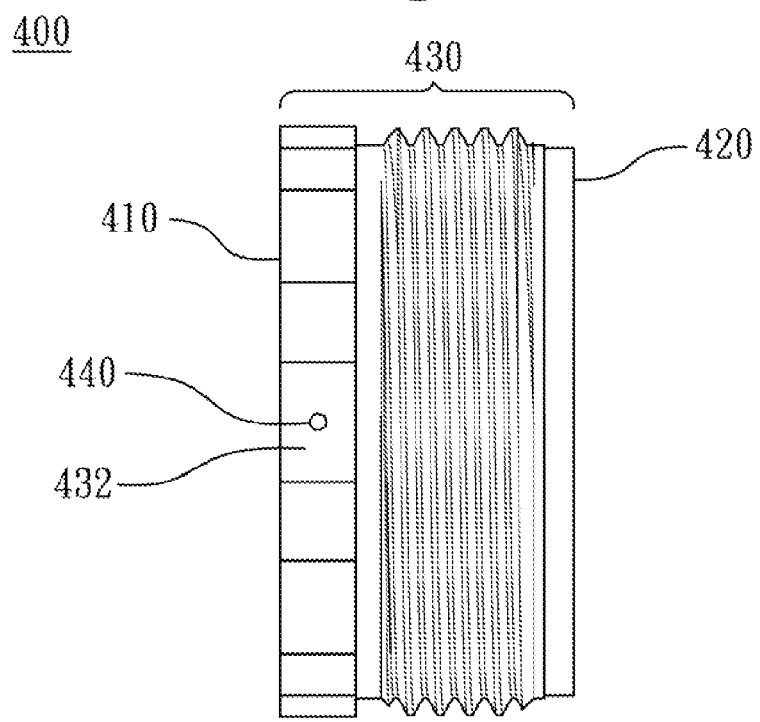
FIG. 4B is a side view of the plastic lens barrel shown in FIG. 4A.

FIG. 4A is a schematic view of a plastic lens barrel according to the 4th embodiment of the present disclosure. FIG. 4B is a side view of the plastic lens barrel shown in FIG. 4A.

In FIG. 4A and FIG. 4B, the plastic lens barrel 400 includes a front portion 410, a rear portion 420, a side portion 430, and three gate vestiges 440. The plastic lens barrel 400 is integrally formed. The front portion 410 and the rear portion 420 are located at two ends of the plastic lens barrel 400, respectively. The side portion 430 connects the front portion 410 and the rear portion 420. The gate vestiges 440 are formed on at least one of the front portion 410, the rear portion 420, and the side portion 430. Specifically, the gate vestiges 440 are formed on the side portion 430 and closer to the front portion 410 than to the rear portion 420. The front portion 410 has a front opening 411, and the rear portion 420 has a rear opening 421. The side portion 430 includes nine indentations 431, three planar cut surfaces 432, and a thread structure 433 thereon. The plastic lens barrel 400 can be utilized in mobile devices.

Figure 4C:
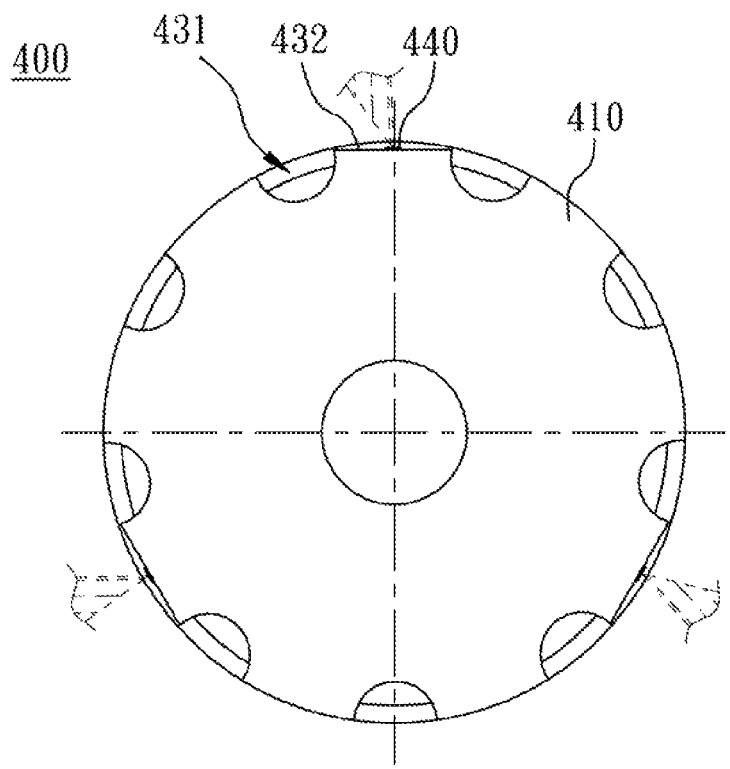
FIG. 4C is a top view of the plastic lens barrel shown in FIG. 4A.

FIG. 4C is a top view of the plastic lens barrel shown in FIG. 4A. In FIG. 4C, the gate vestiges 440 are symmetrically formed around a central axis X' 2) (referring to FIG. 4D) of the plastic lens barrel 400. Each of the gate vestiges 440 is formed separately on one of the planar cut surfaces 432. Specifically, each of the planar cut surfaces 432 corresponds to each of the gate vestiges 440 and the gate vestiges 440 are formed on the planar cut surfaces 432. The indentations 431 along with the thread structure 433 are also symmetrically formed around the central axis X' of the plastic lens barrel 400. The gate vestiges 440 and the indentations 431 are regularly and alternatively arranged around the central axis X' of the plastic lens barrel 400.

Figure 4D:
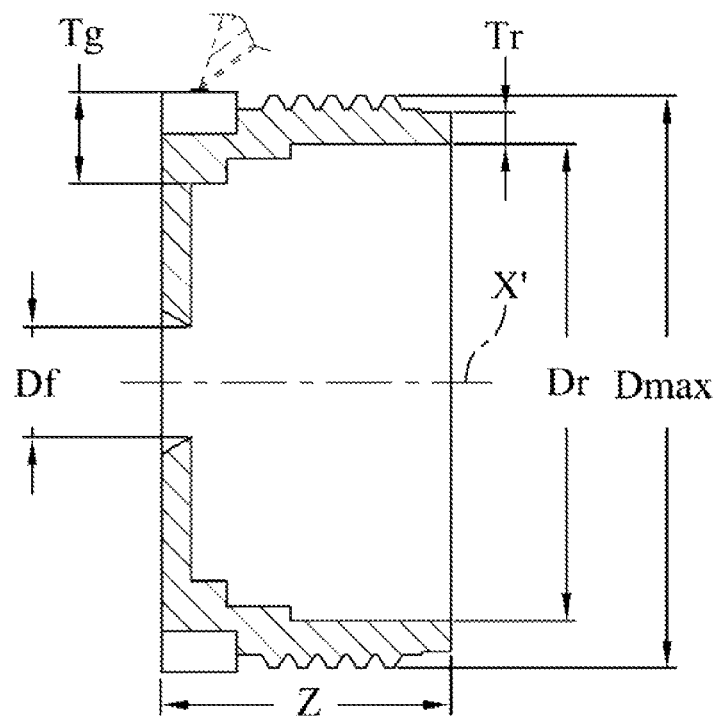
FIG. 4D is a sectional view of the plastic lens barrel shown in FIG. 4A.

FIG. 4D is a sectional view of the plastic lens barrel shown in FIG. 4A. In FIG. 4D, an outermost diameter of the plastic lens barrel 400 is Dmax, a height of the plastic lens barrel 400 is Z, a diameter of the front opening 411 is Df, a diameter of the rear opening 421 is Dr, a first thickness of the plastic lens barrel near one of the gate vestiges 440 is Tg, and a second thickness of the plastic lens barrel near the rear portion 420 is Tr. Specifically, Tg is a distance perpendicular to the central axis X' from an outer edge of one of the gate vestiges 440 to an inner surface of the plastic lens barrel 400 opposite to the outer edge. Tr is a distance perpendicular to the central axis X' from an outer boundary between the rear portion 420 and the side portion 430 to an inner surface of the plastic lens barrel 400 opposite to the outer boundary. Dmax, Df, Dr, Z, Tg, Tr, Z/Dmax, Df/Dr, and Tg/Tr of the 4th embodiment are shown in Table 7 and Table 8.

5th Embodiment

Figure 5A:
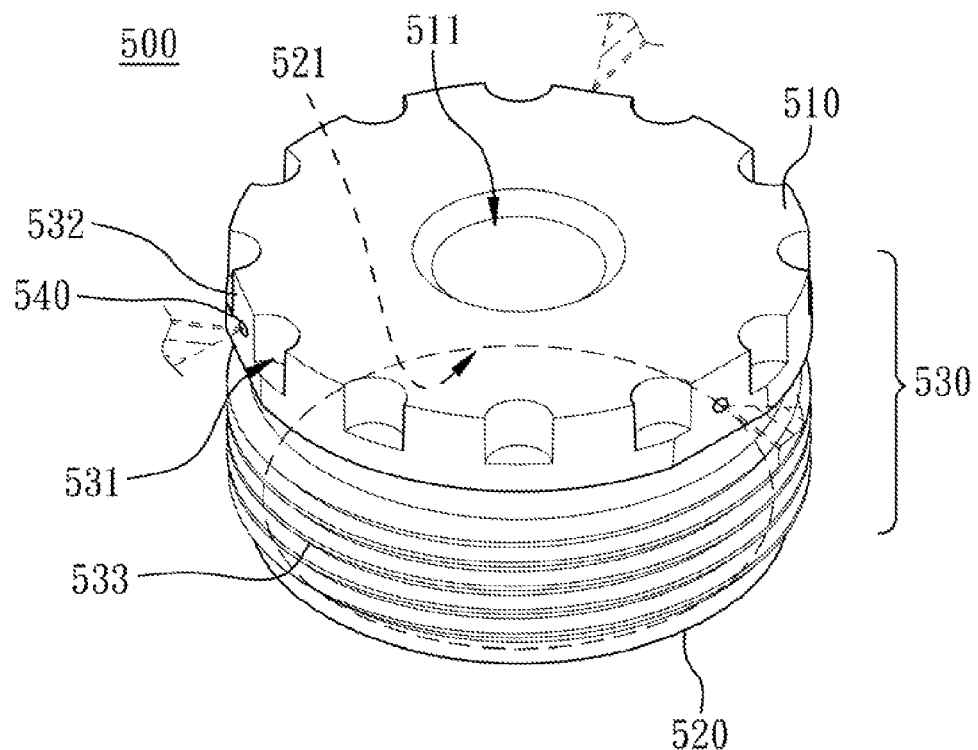
FIG. 5A is a schematic view of a plastic lens barrel according to the 5th embodiment of the present disclosure.
Figure 5B:
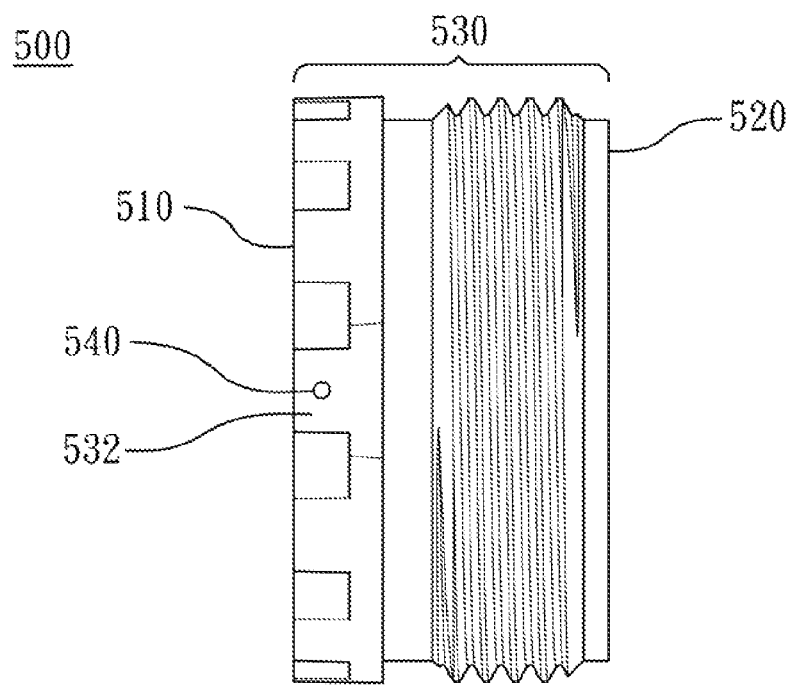
FIG. 5B is a side view of Fig. the plastic lens barrel shown in 5A.

FIG. 5A is a schematic view of a plastic lens barrel according to the 5th embodiment of the present disclosure. FIG. 5B is a side view of the plastic lens barrel shown in FIG. 5A.

In FIG. 5A and FIG. 5B, the plastic lens barrel 500 includes a front portion 510, a rear portion 520, a side portion 530, and three gate vestiges 540. The plastic lens barrel 500 is integrally formed. The front portion 510 and the rear portion 520 are located at two ends of the plastic lens barrel 500, respectively. The side portion 530 connects the front portion 510 and the rear portion 520. The gate vestiges 540 are formed on at least one of the front portion 510, the rear portion 520, and the side portion 530. Specifically, the gate vestiges 540 are formed on the side portion 530 and closer to the front portion 510 than to the rear portion 520. The front portion 510 has a front opening 511, and the rear portion 520 has a rear opening 521. The side portion 530 includes twelve indentations 531, three planar cut surfaces 532, and a thread structure 533 thereon. The plastic lens barrel 500 can be utilized in mobile devices.

Figure 5C:
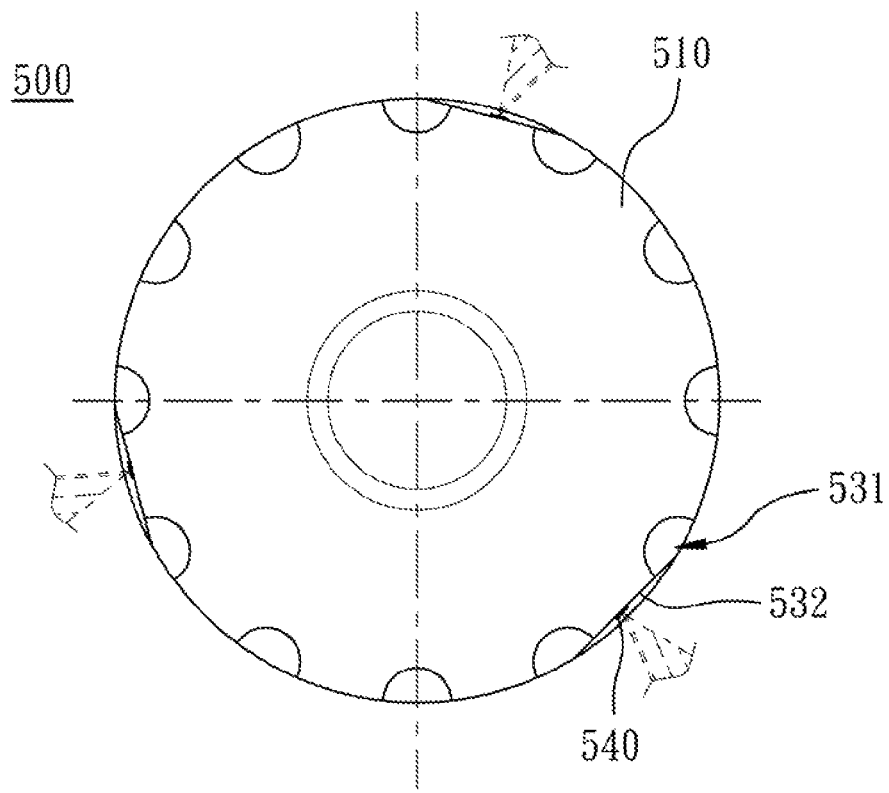
FIG. 5C is a top view of the plastic lens barrel shown in FIG. 5A.

FIG. 5C is a top view of the plastic lens barrel shown in FIG. 5A. In FIG. 5C, the gate vestiges 540 are symmetrically formed around a central axis X' (referring to FIG. 5D) of the plastic lens barrel 500. Each of the gate vestiges 540 is formed separately on one of the planar cut surfaces 532. Specifically, each of the planar cut surfaces 532 corresponds to each of the gate vestiges 540 and the gate vestiges 540 are formed on the planar cut surfaces 532. The indentations 531 along with the thread structure 533 are also symmetrically formed around the central axis X' of the plastic lens barrel 500. The gate vestiges 540 and the indentations 531 are regularly and alternatively arranged around the central axis X' of the plastic lens barrel 500.

Figure 5D:
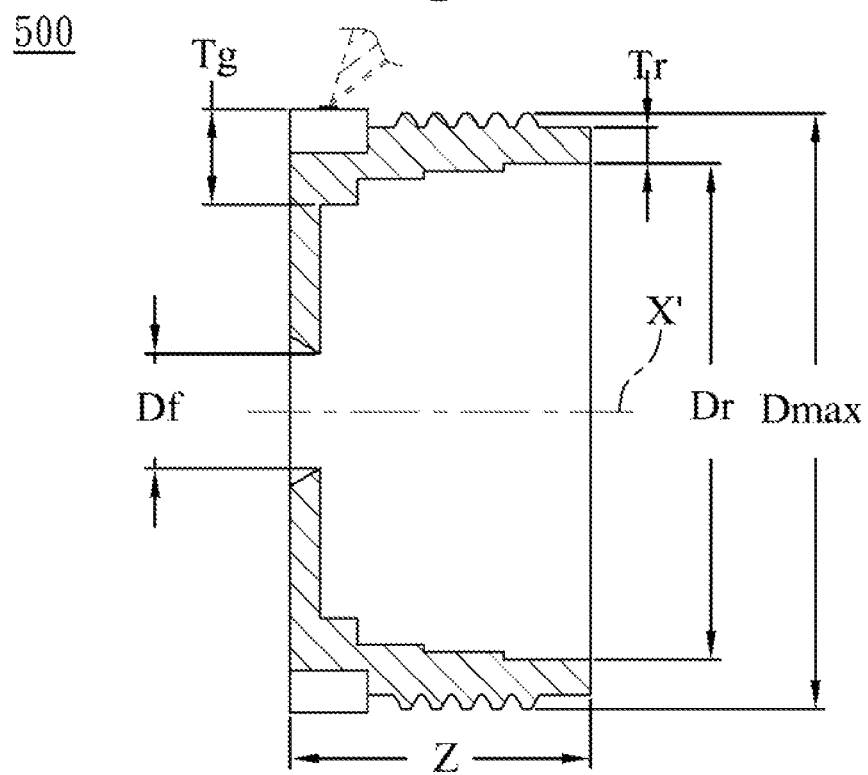
FIG. 5D is a sectional view of the plastic lens barrel shown in FIG. 5A.

FIG. 5D is a sectional view of the plastic lens barrel shown in FIG. 5A. In FIG. 5O, an outermost diameter of the plastic lens barrel 500 is Dmax, a height of the plastic lens barrel 500 is Z, a diameter of the front opening 511 is Df, a diameter of the rear opening 521 is Dr, a first thickness of the plastic lens barrel near one of the gate vestiges 540 is Tg, and a second thickness of the plastic lens barrel near the rear portion 520 is Tr. Specifically, Tg is a distance perpendicular to the central axis X' from an outer edge of one of the gate vestiges 540 to an inner surface of the plastic lens barrel 500 opposite to the outer edge. Tr is a distance perpendicular to the central axis X' from an outer boundary between the rear portion 520 and the side portion 530 to an inner surface of the plastic lens barrel 500 opposite to the outer boundary. Dmax, Df, Dr, Z, Tg, Tr, Z/Dmax, Df/Dr, and Tg/Tr of the 5th embodiment are shown in Table 9 and Table 10.

TABLE 9

5th Embodiment (unit: mm)

| Dmax | Df | Dr | Z | Tg | Tr |
|---|---|---|---|---|---|
| 7.0 | 2.1 | 5.8 | 3.75 | 1.1 | 0.41 |

TABLE 10

| Z/Dmax | Df/Dr | Tg/Tr |
|---|---|---|
| 0.536 | 0.362 | 2.683 |

6th Embodiment

Figure 6A:
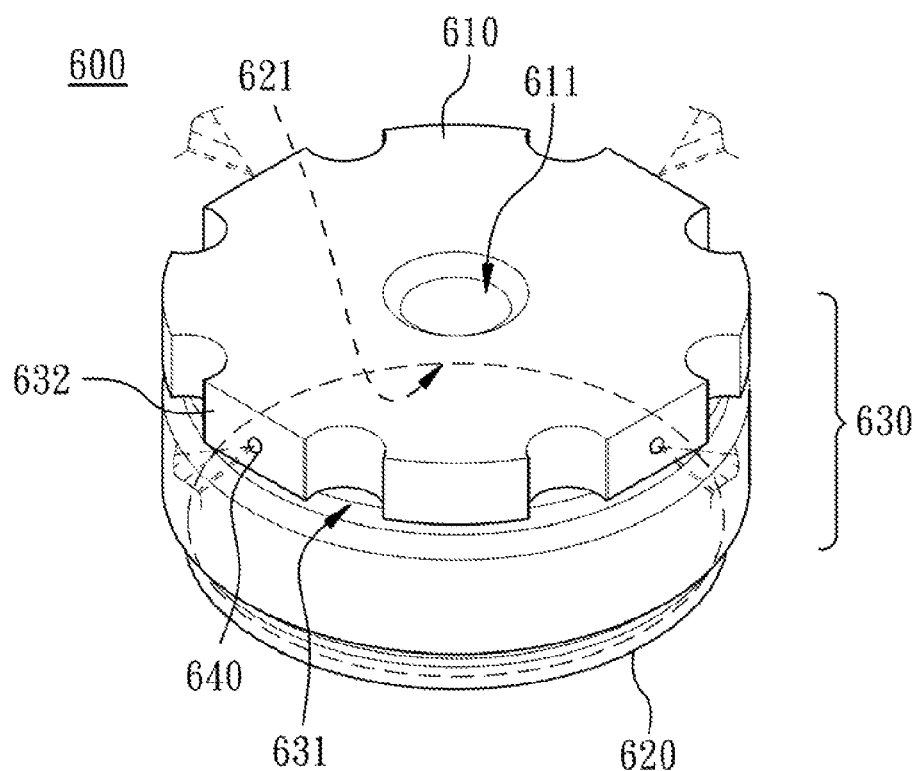
FIG. 6A is a schematic view of a plastic lens barrel according to the 6th embodiment of the present disclosure.
Figure 6B:
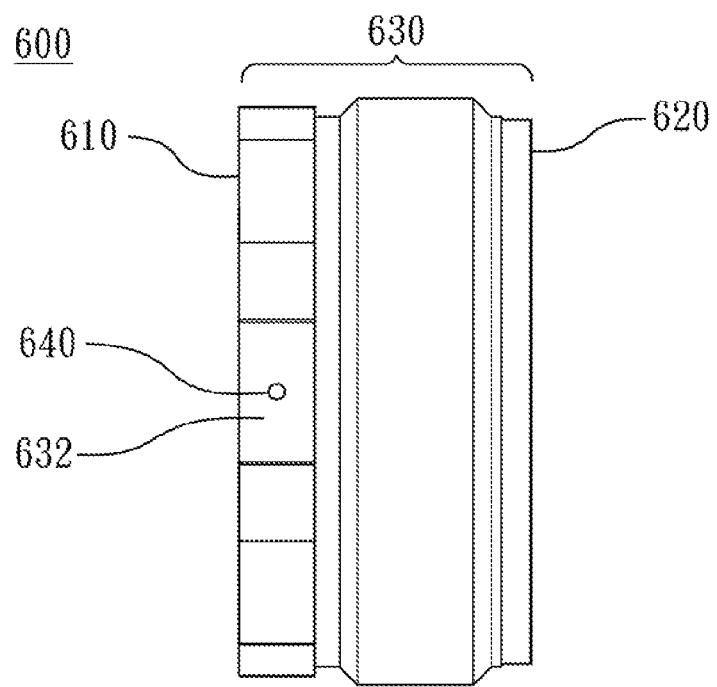
FIG. 6B is a side view of the plastic lens barrel shown in FIG. 6A.

FIG. 6A is a schematic view of a plastic lens barrel according to the 6th embodiment of the present disclosure. FIG. 6B is a side view of the plastic lens barrel shown in FIG. 6A.

In FIG. 6A and FIG. 6B, the plastic lens barrel 600 includes a front portion 610, a rear portion 620, a side portion 630, and four gate vestiges 640. The plastic lens barrel 600 is integrally formed. The front portion 610 and the rear portion 620 are located at two ends of the plastic lens barrel 600, respectively. The side portion 630 connects the front portion 610 and the rear portion 620. The gate vestiges 640 are formed on at least one of the front portion 610, the rear portion 620, and the side portion 630. Specifically, the gate vestiges 640 are formed on the side portion 630 and closer to the front portion 610 than to the rear portion 620. The front portion 610 has a front opening 611, and the rear portion 620 has a rear opening 621. The side portion 630 includes eight indentations 631, and four planar cut surfaces 632. The plastic lens barrel 600 can be utilized in mobile devices.

Figure 6C:
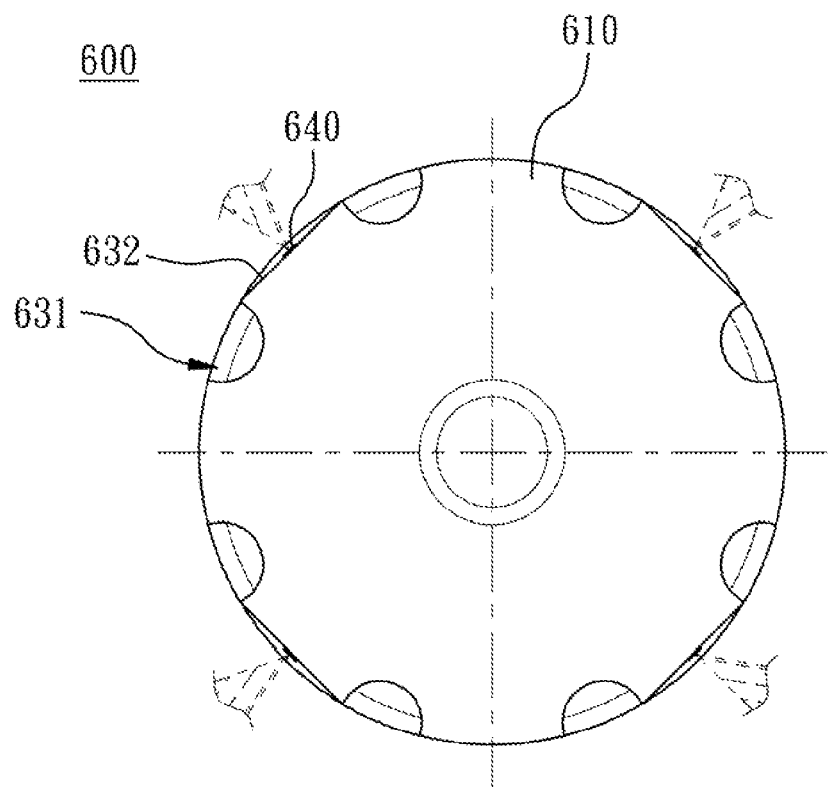
FIG. 6C is a top view of the plastic lens barrel shown in FIG. 6A.

FIG. 6C is a top view of the plastic lens barrel shown in FIG. 6A. In FIG. 6C, the gate vestiges 640 are symmetrically formed around a central axis X' (referring to FIG. 6D) of the plastic lens barrel 600. Each of the gate vestiges 640 is formed separately on one of the planar cut surfaces 632. Specifically, each of the planar cut surfaces 632 corresponds to each of the gate vestiges 640 and the gate vestiges 640 are formed on the planar cut surfaces 632. The indentations 631 are also symmetrically formed around the central axis X' of the plastic lens barrel 600. The gate vestiges 640 and the indentations 631 are regularly and alternatively arranged around the central axis X' of the plastic lens barrel 600.

Figure 6D:
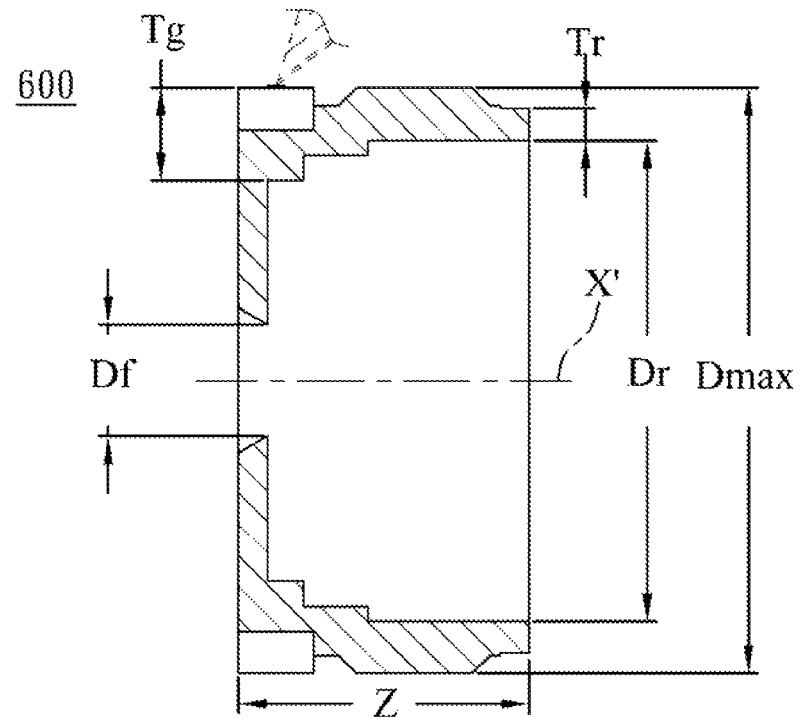
FIG. 6D is a sectional view of the plastic lens barrel shown in FIG. 6A.

FIG. 6D is a sectional view of the plastic lens barrel shown in FIG. 6A. In FIG. 6D, an outermost diameter of the plastic lens barrel 600 is Dmax, a height of the plastic lens barrel 600 is Z, a diameter of the front opening 611 is Df, a diameter of the rear opening 621 is Dr, a first thickness of the plastic lens barrel near one of the gate vestiges 640 is Tg, and a second thickness of the plastic lens barrel near the rear portion 620 is Tr. Specifically, Tg is a distance perpendicular to the central axis X' from an outer edge of one of the gate vestiges 640 to an inner surface of the plastic lens barrel 600 opposite to the outer edge. Tr is a distance perpendicular to the central axis X' from an outer boundary between the rear portion 620 and the side portion 630 to an inner surface of the plastic lens barrel 600 opposite to the outer boundary. Dmax, Df, Dr, Z, Tg, Tr, Z/Dmax, Df/Dr, and Tg/Tr of the 6th embodiment are shown in Table 11 and Table 12.

TABLE 11

6th Embodiment (unit: mm)

| Dmax | Df | Dr | Z | Tg | Tr |
|---|---|---|---|---|---|
| 7.0 | 1.33 | 5.7 | 3.5 | 1.1 | 0.41 |

TABLE 12

| Z/Dmax | Df/Dr | Tg/Tr |
|---|---|---|
| 0.500 | 0.233 | 2.683 |

7th Embodiment

Figure 7A:
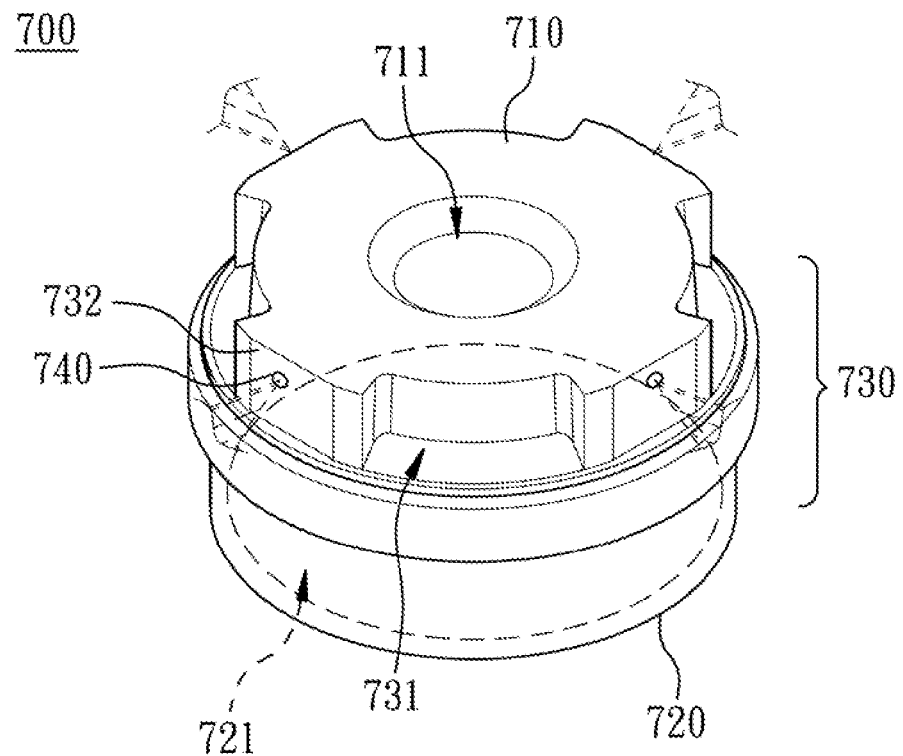
FIG. 7A is a schematic view of a plastic lens barrel according to the 7th embodiment of the present disclosure.
Figure 7B:
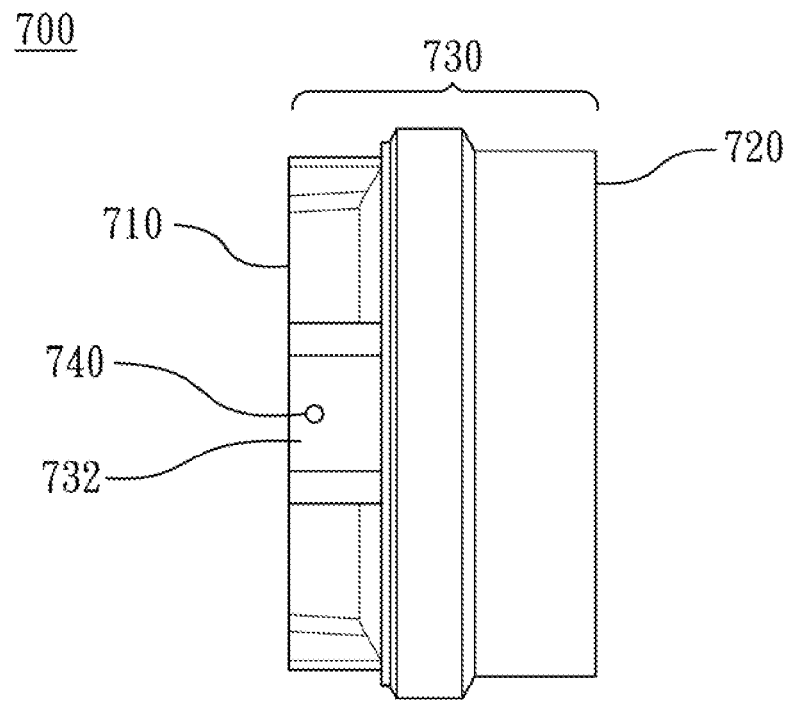
FIG. 7B is a side view of the plastic lens barrel shown in FIG. 7A.

FIG. 7A is a schematic view of a plastic lens barrel according to the 7th embodiment of the present disclosure. FIG. 7B is a side view of the plastic lens barrel shown in FIG. 7A.

In FIG. 7A and FIG. 7B, the plastic lens barrel 700 includes a front portion 710, a rear portion 720, a side portion 730, and four gate vestiges 740. The plastic lens barrel 700 is integrally formed. The front portion 710 and the rear portion 720 are located at two ends of the plastic lens barrel 700, respectively. The side portion 730 connects the front portion 710 and the rear portion 720. The gate vestiges 740 are formed at least one of the front portion 710, the rear portion 720, and the side portion 730. Specifically, the gate vestiges 740 are formed on the side portion 730 and closer to the front portion 710 than to the rear portion 720. The front portion 710 has a front opening 711, and the rear portion 720 has a rear opening 721. The side portion 730 includes four indentations 731, and four planar cut surfaces 732. The plastic lens barrel 700 can be utilized in mobile devices.

Figure 7C:
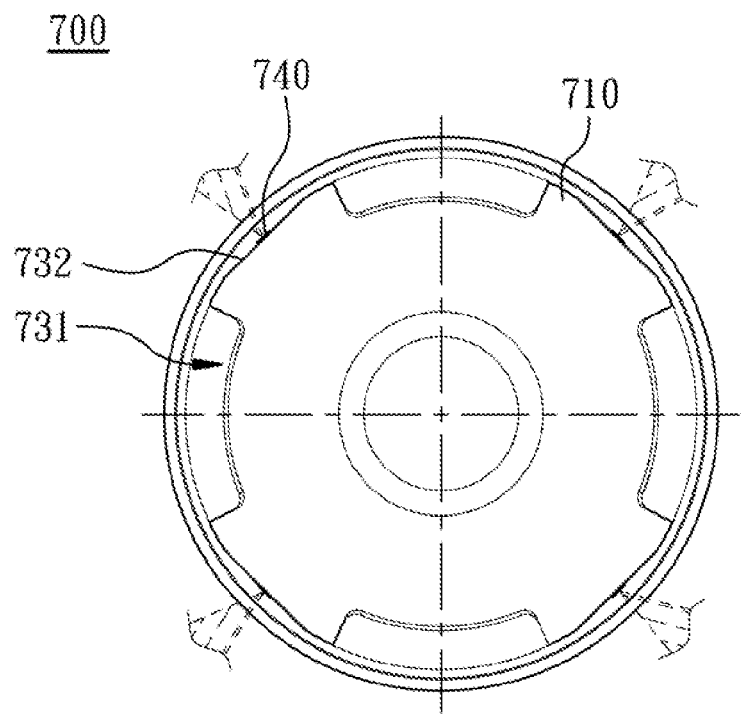
FIG. 7C is a top view of the plastic lens barrel shown in FIG. 7A.

FIG. 7C is a top view of the plastic lens barrel shown in FIG. 7A. In FIG. 7C, the gate vestiges 740 are symmetrically formed around a central axis X' (referring to FIG. 7D) of the plastic lens barrel 700. Each of the gate vestiges 740 is formed separately on one of the planar cut surfaces 732. Specifically, each of the planar cut surfaces 732 corresponds to each of the gate vestiges 740 and the gate vestiges 740 are formed on the planar cut surfaces 732. The indentations 731 are also symmetrically formed around the central axis X' of the plastic lens barrel 700. Specifically, the gate vestiges 740 and the indentations 731 are alternatively arranged around the central axis X' of the plastic lens barrel 700.

Figure 7D:
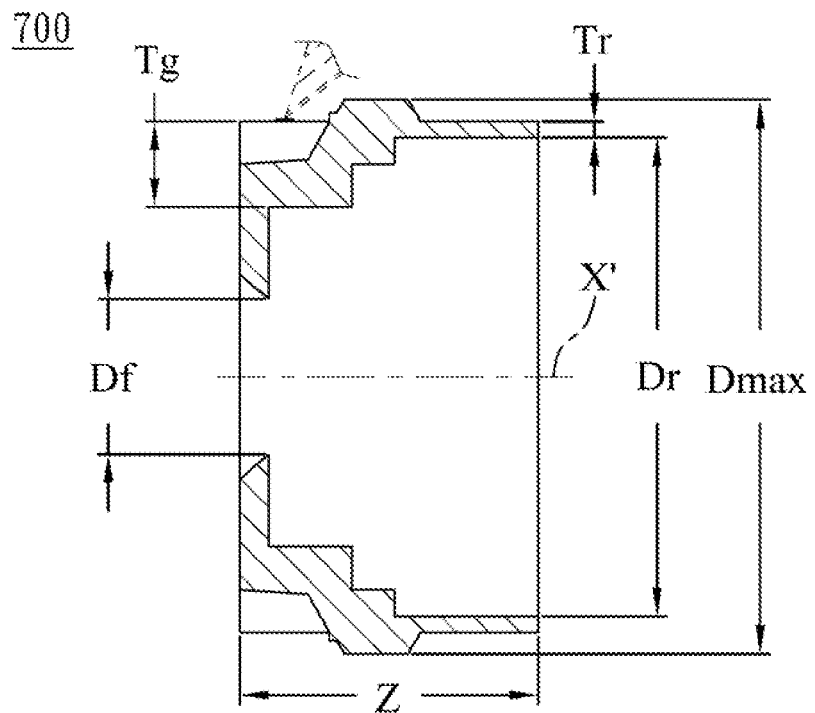
FIG. 7D is a sectional view of the plastic lens barrel shown in FIG. 7A.

FIG. 7D is a sectional view of the plastic lens barrel shown in FIG. 7A. In FIG. 7D, an outermost diameter of the plastic lens barrel 700 is Dmax, a height of the plastic lens barrel 700 is Z, a diameter of the front opening 711 is Df, a diameter of the rear opening 721 is Dr, a first thickness of the plastic lens barrel near one of the gate vestiges 740 is Tg, and a second thickness of the plastic lens barrel near the rear portion 720 is Tr. Specifically, Tg is a distance perpendicular to the central axis X' from an outer edge of one of the gate vestiges 740 to an inner surface of the plastic lens barrel 700 opposite to the outer edge. Tr is a distance perpendicular to the central axis X' from an outer boundary between the rear portion 720 and the side portion 730 to an inner surface of the plastic lens barrel 700 opposite to the outer boundary. Dmax, Df, Dr, Z, Tg, Tr, Z/Dmax, Df/Dr, and Tg/Tr of the 7th embodiment are shown in Table 13 and Table 14.

TABLE 13

7th Embodiment (unit: mm)

| Dmax | Df | Dr | Z | Tg | Tr |
|---|---|---|---|---|---|
| 6.5 | 1.82 | 5.5 | 3.5 | 1.0 | 0.19 |

TABLE 14

| Z/Dmax | Df/Dr | Tg/Tr |
|---|---|---|
| 0.538 | 0.331 | 5.263 |

8th Embodiment

Figure 8A:
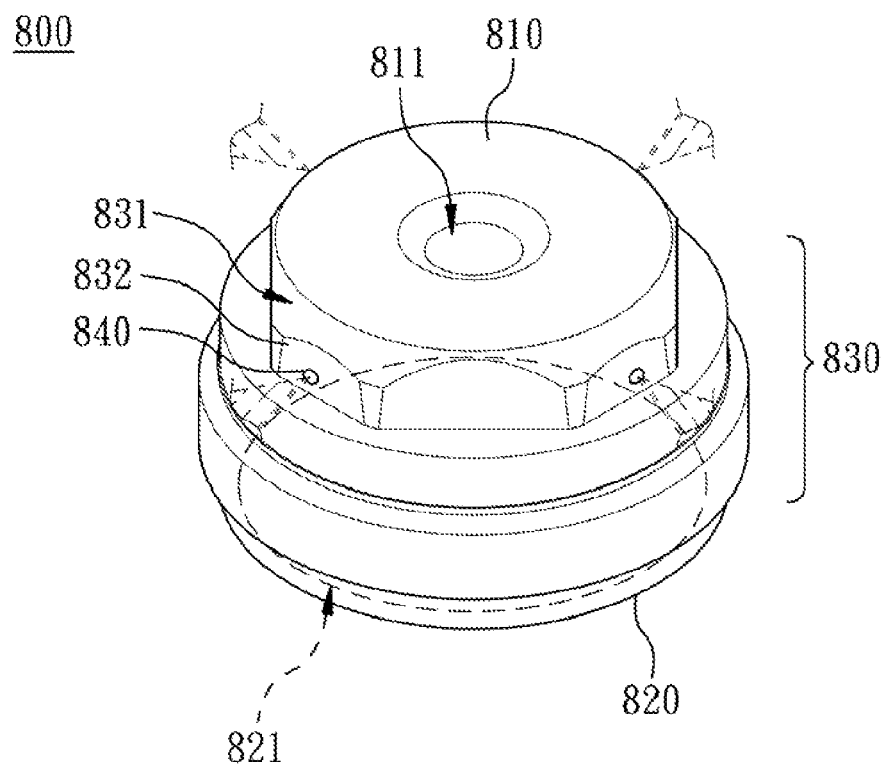
FIG. 8A is a schematic view of a plastic lens barrel according to the 8th embodiment of the present disclosure.
Figure 8B:
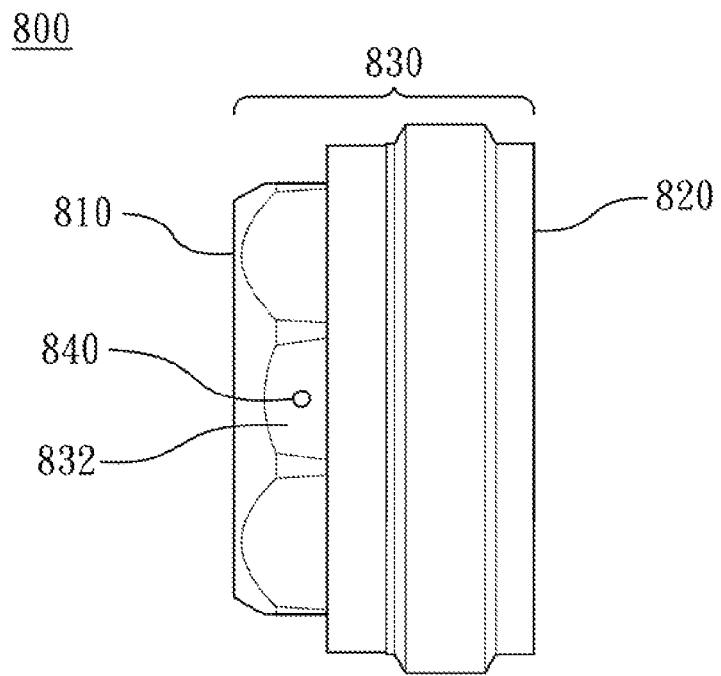
FIG. 8B is a side view of the plastic lens barrel shown in FIG. 8A.

FIG. 8A is a schematic view of a plastic lens barrel according to the 8th embodiment of the present disclosure. FIG. 8B is a side view of the plastic lens barrel shown in FIG. 8A.

In FIG. 8A and FIG. 8B, the plastic lens barrel 800 includes a front portion 810, a rear portion 820, a side portion 830, and four gate vestiges 840. The plastic lens barrel 800 is integrally formed. The front portion 810 and the rear portion 820 are located at two ends of the plastic lens barrel 800, respectively. The side portion 830 connects the front portion 810 and the rear portion 820. The gate vestiges 840 are formed on at least one of the front portion 810, the rear portion 820, and the side portion 830. Specifically, the gate vestiges 840 are formed on the side portion 830 and closer to the front portion 810 than to the rear portion 820. The front portion 810 has a front opening 811, and the rear portion 820 has a rear opening 821. The side portion 830 includes four indentations 831, and four planar cut surfaces 832. The plastic lens barrel 800 can be utilized in mobile devices.

Figure 8C:
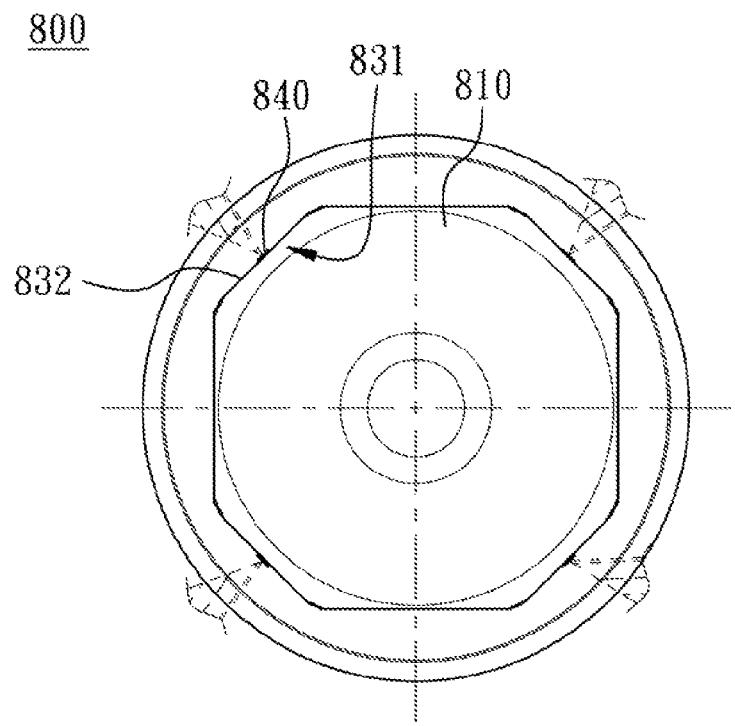
FIG. 8C is a top view of the plastic lens barrel shown in FIG. 8A.

FIG. 8C is a top view of the plastic lens barrel shown in FIG. 8A. In FIG. 8C, the gate vestiges 840 are symmetrically formed around a central axis X' (referring to FIG. 8D) of the plastic lens barrel 800. Each of the gate vestiges 840 is formed separately on one of the planar cut surfaces 832. Specifically, each of the planar cut surfaces 832 corresponds to each of the gate vestiges 840 and the gate vestiges 840 are formed on the planar cut surfaces 832. The indentations 831 are also symmetrically formed around the central axis X' of the plastic lens barrel 800. The indentations 831 are arranged over the gate vestiges 840 and correspond to the gate vestiges 840.

Figure 8D:
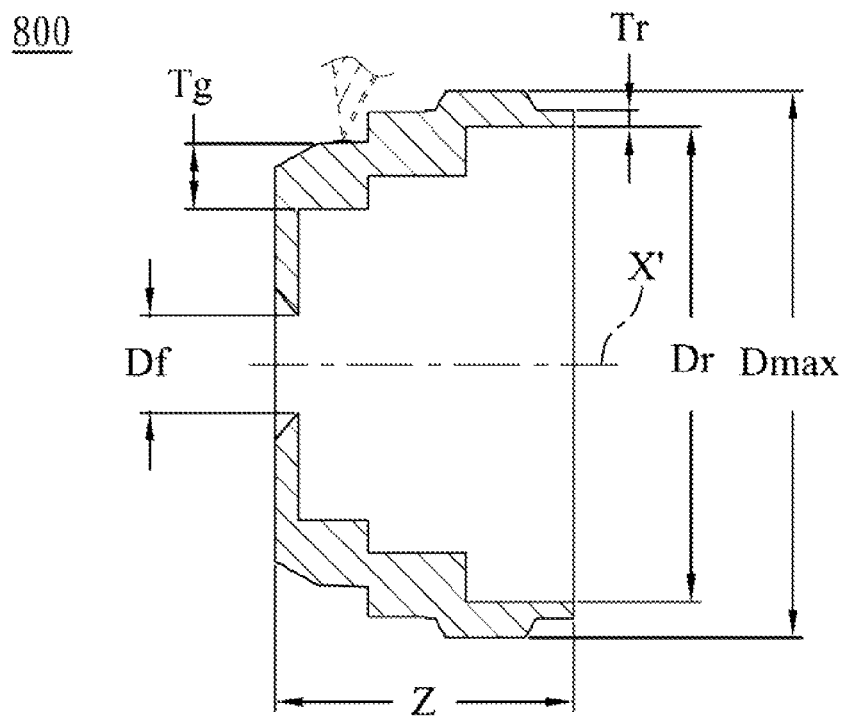
FIG. 8D is a sectional view of the plastic lens barrel shown in FIG. 8A.

FIG. 8D is a sectional view of the plastic lens barrel shown in FIG. 8A. In FIG. 8D, an outermost diameter of the plastic lens barrel 800 is Dmax, a height of the plastic lens barrel 800 is Z, a diameter of the front opening 811 is Df, a diameter of the rear opening 821 is Dr, a first thickness of the plastic lens barrel near one of the gate vestiges 840 is Tg, and a second thickness of the plastic lens barrel near the rear portion 820 is Tr. Specifically, Tg is a distance perpendicular to the central axis X' from an outer edge of one of the gate vestiges 840 to an inner surface of the plastic lens barrel 800 opposite to the outer edge. Tr is a distance perpendicular to the central axis X' from an outer boundary between the rear portion 820 and the side portion 830 to an inner surface of the plastic lens barrel 800 opposite to the outer boundary. Dmax, Df, Dr, Z, Tg, Tr, Z/Dmax, Df/Dr, and Tg/Tr of the 8th embodiment are shown in Table 15 and Table 16.

TABLE 15

8th Embodiment (unit: mm)

| Dmax | Df | Dr | Z | Tg | Tr |
|---|---|---|---|---|---|
| 6.5 | 1.16 | 5.7 | 3.55 | 0.79 | 0.2 |

TABLE 16

| Z/Dmax | Df/Dr | Tg/Tr |
|---|---|---|
| 0.546 | 0.204 | 3.95 |

9th Embodiment

Figure 9A:
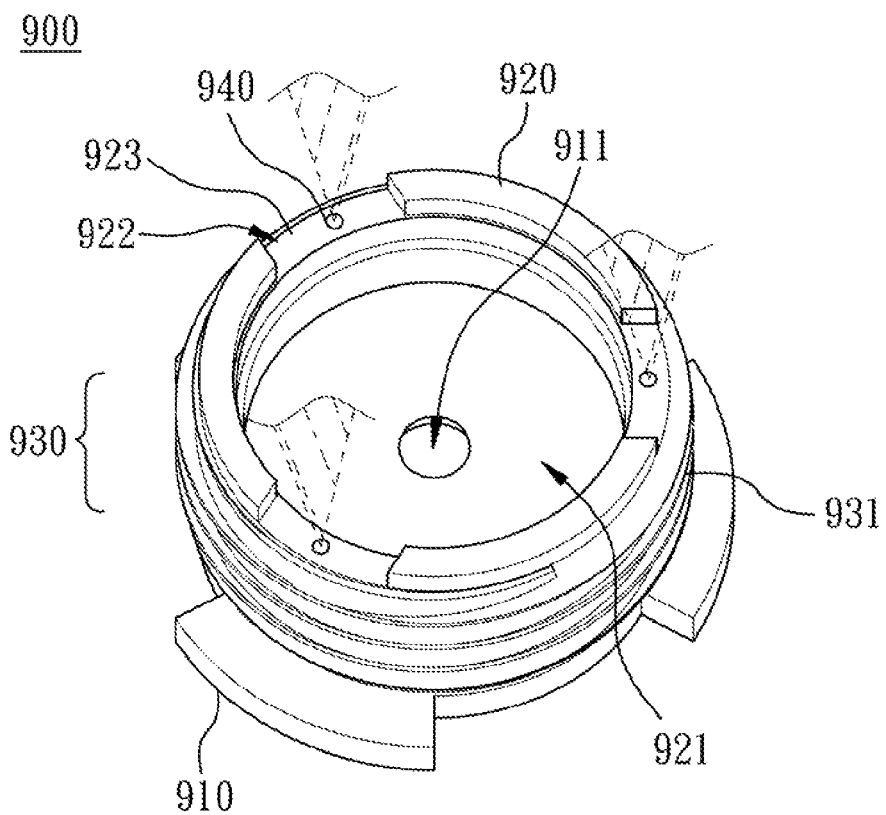
FIG. 9A is a schematic view of a plastic lens barrel according to the 9th embodiment of the present disclosure.
Figure 9B:
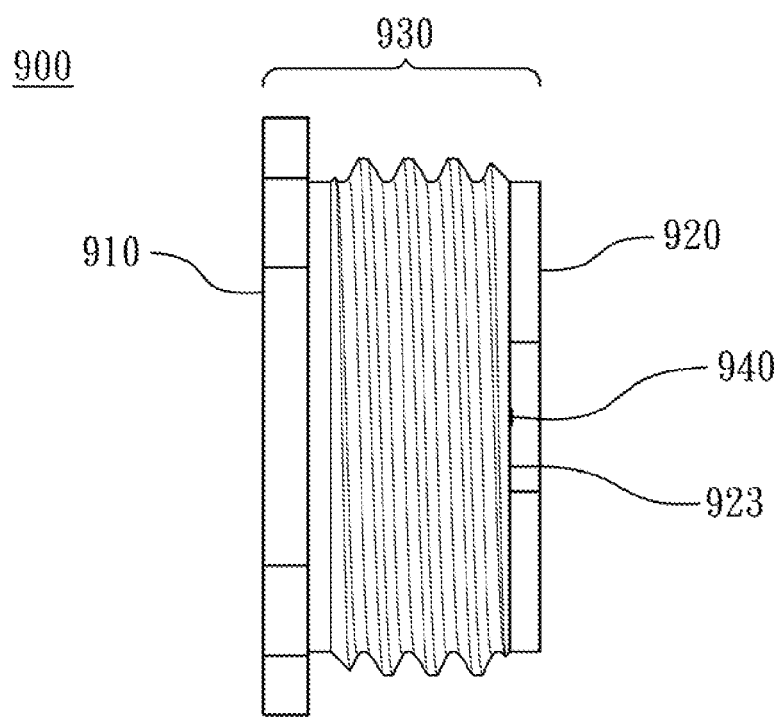
FIG. 9B is a side view of the plastic lens barrel shown in FIG. 9A.

FIG. 9A is a schematic view of a plastic lens barrel according to the 9th embodiment of the present disclosure. FIG. 9B is a side view of the plastic lens barrel shown in FIG. 9A.

In FIG. 9A and FIG. 9B, the plastic lens barrel 900 includes a front portion 910, a rear portion 920, a side portion 930, and three gate vestiges 940. The plastic lens barrel 900 is integrally formed. The front portion 910 and the rear portion 920 are located at two ends of the plastic lens barrel 900, respectively. The side portion 930 connects the front portion 910 and the rear portion 920. The gate vestiges 940 are formed on at least one of the front portion 910, the rear portion 920, and the side portion 930. Specifically, the gate vestiges 940 are formed on the rear portion 920.

The front portion 910 has a front opening 911. The rear portion 920 has a rear opening 921, three indentations 922 and three planar cut surfaces 923. The planar cut surfaces 923 are symmetrically formed around the rear opening 921. Specifically, the planar cut surfaces 923 are symmetrically formed around the central axis X' (referring to FIG. 9D) of the plastic lens barrel 900. The indentations 922 are formed above the planar cut surfaces 923. In other words, the indentations 922 are also symmetrically formed around the central axis X' of the plastic lens barrel 900. The side portion 930 has a thread structure 931 thereon. The plastic lens barrel 900 can be utilized in mobile devices.

Figure 9C:
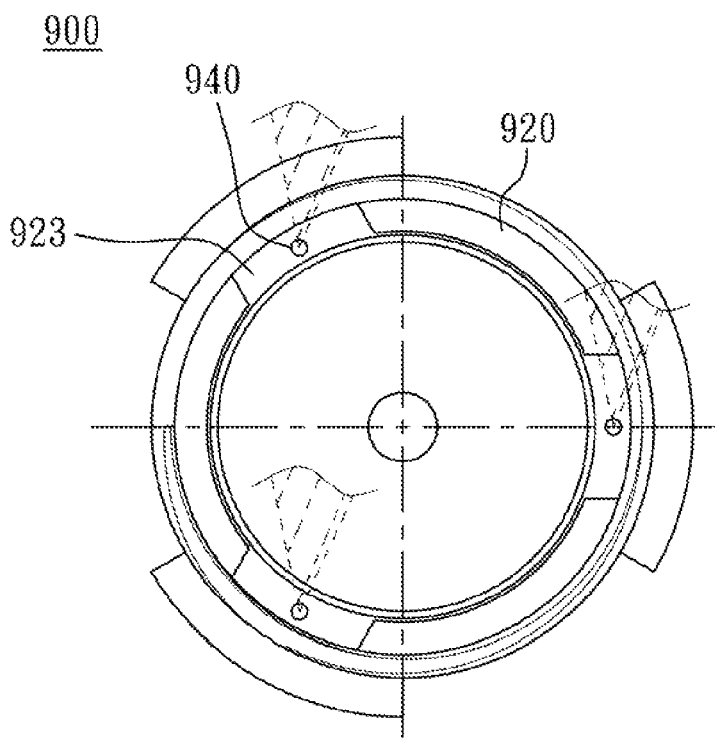
FIG. 9C is a rear view of the plastic lens barrel shown in FIG. 9A.
Figure 9D:
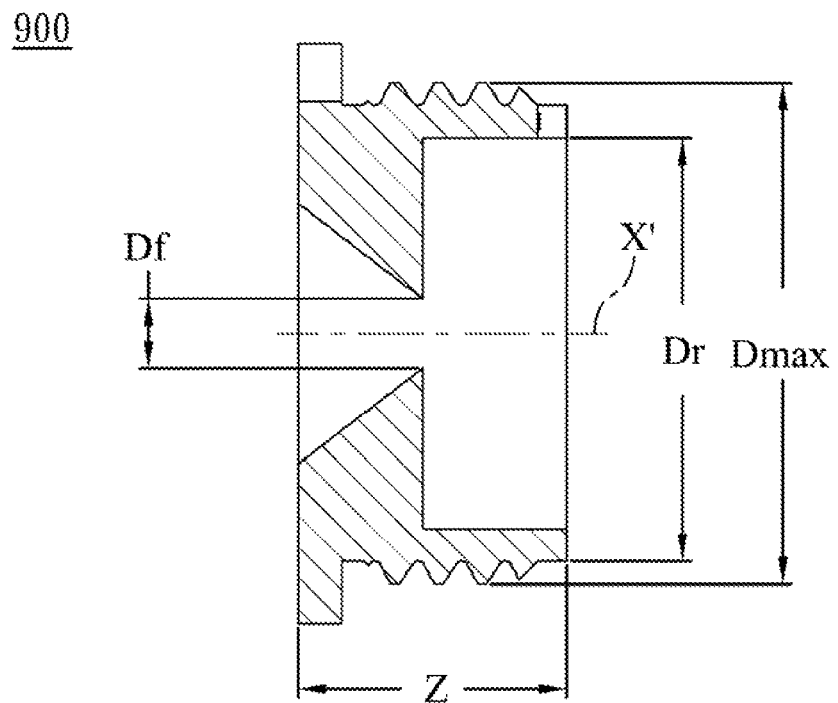
FIG. 9D is a sectional view of the plastic lens barrel shown in FIG. 9A.

FIG. 9C is a rear view of the plastic lens barrel shown in FIG. 9A. In FIG. 9C, each of the gate vestiges 940 is formed separately on one of the planar cut surfaces 923. Specifically, each of the gate vestiges 940 is formed on each of the planar cut surfaces 923. In other words, the gate vestiges 940 are symmetrically formed on the rear portion 920 around the central axis X' of the plastic lens barrel 900. FIG. 9D is a sectional view of the plastic lens barrel shown in FIG. 9A. In FIG. 9D, an outermost diameter of the plastic lens barrel 900 is Dmax, a height of the plastic lens barrel 900 is Z, a diameter of the front opening 911 is Df, and a diameter of the rear opening 921 is Dr. Dmax, Df, Dr, Z, Z/Dmax, and Df/Dr of the 9th embodiment are shown in Table 17 and Table 18.

TABLE 17

9th Embodiment (unit: mm)

| Dmax | Df | Dr | Z |
|---|---|---|---|
| 3.5 | 0.5 | 2.7 | 1.85 |

TABLE 18

| Z/Dmax | Df/Dr |
|---|---|
| 0.529 | 0.185 |

In other embodiments, at least three gate vestiges symmetrically formed around a central axis of a plastic lens barrel may not be in a horizontal form. However, the following relationship is still satisfied $2.0<Tg/Tr<7.5$, wherein Tg is a first thickness of the plastic lens barrel near one of the gate vestiges and Tr is a second thickness of the plastic lens barrel near a rear portion of the plastic lens barrel. Specifically, Tg is a distance perpendicular to the central axis of the plastic lens barrel from an outer edge of anyone of the gate vestiges to an inner surface of the plastic lens barrel opposite to the outer edge.

[Method of Manufacturing the Plastic Lens Barrel]

FIG. 10 is a flowchart illustrating a method for manufacturing the plastic lens barrel by injection molding with a plurality of injection channels according to the present disclosure. In step 1010, an injection mold of a plastic lens barrel structure with at least three injection channels is provided. In step 1020, a molding material is injected into the injection mold through the injection channels to obtain the plastic lens barrel.

Figure 11:
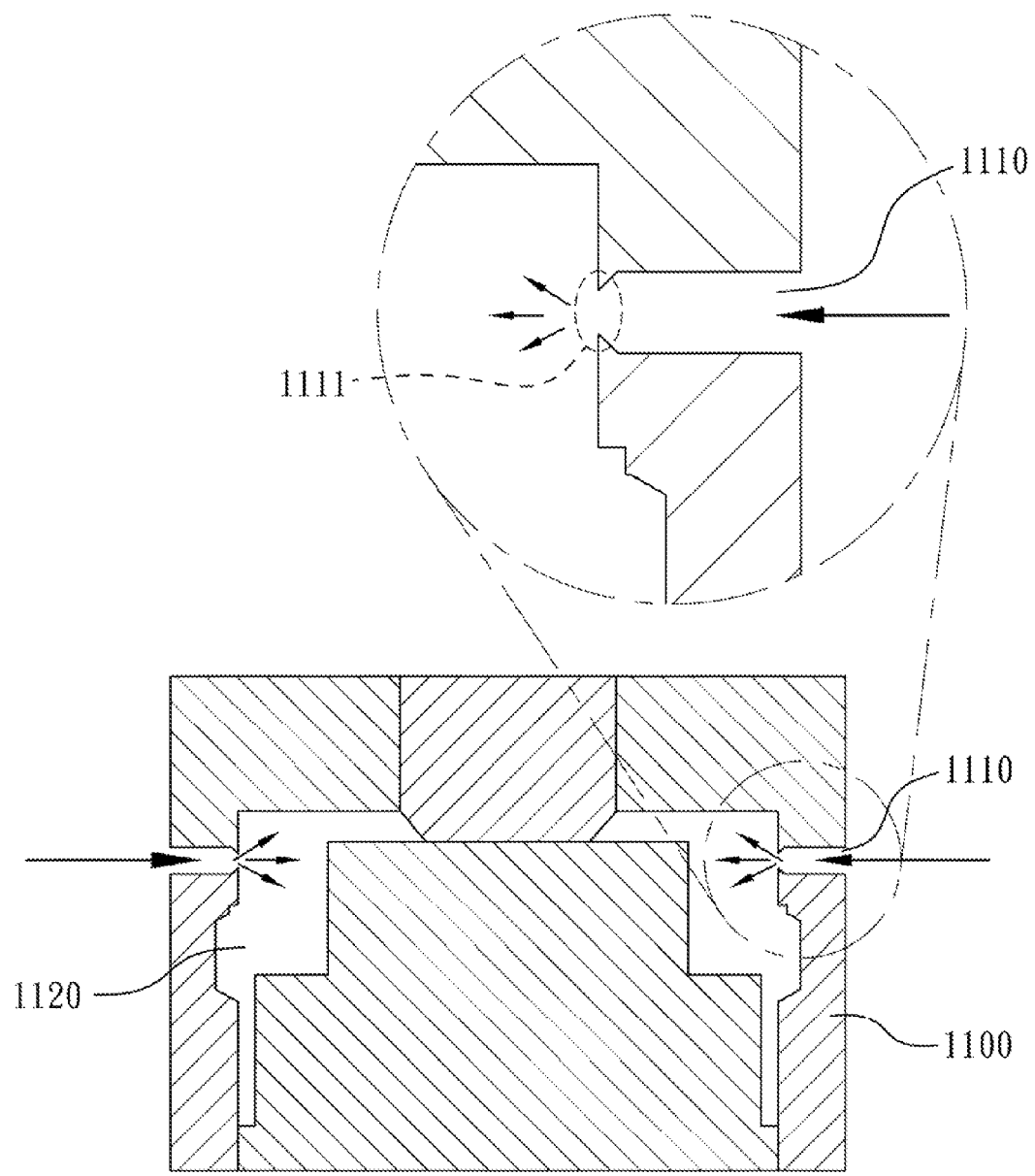
FIG. 11 is a schematic view of an injection mold used for manufacturing the plastic lens barrel.
Figure 12:
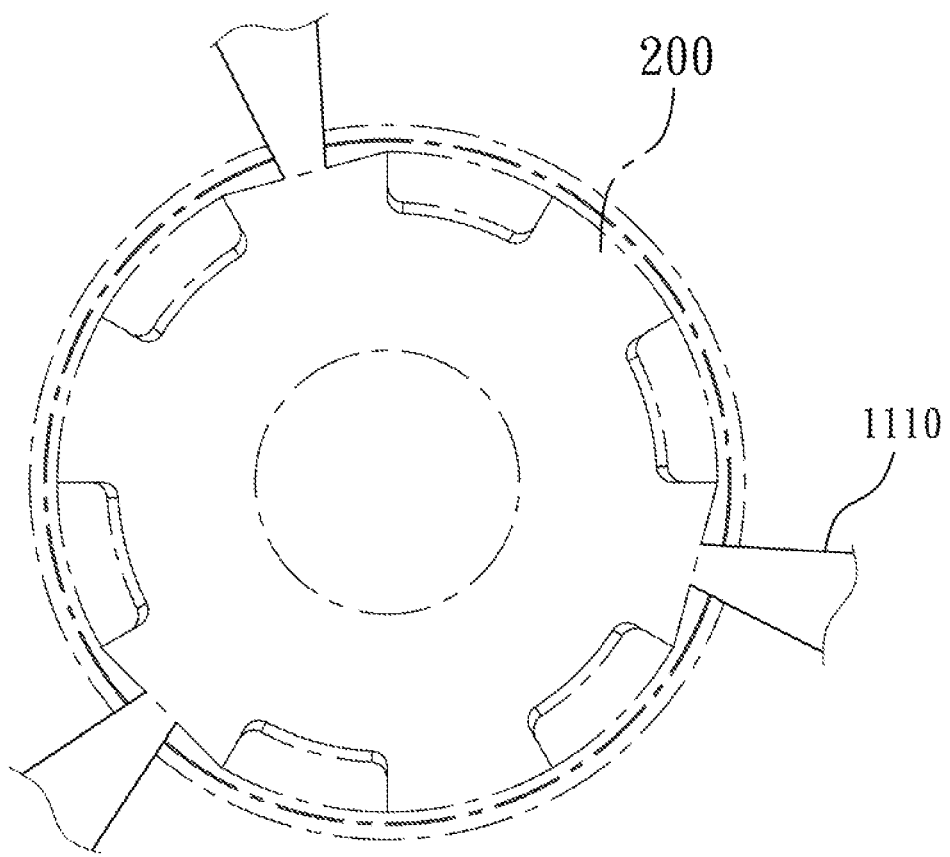
FIG. 12 is a schematic view showing the location of three injection channels of the injection mold.

The plastic lens barrel 200 is taken as an example hereinafter. FIG. 11 is a schematic view of an injection mold used for manufacturing the plastic lens barrel. FIG. 12 is a schematic view showing the location of three injection channels of the injection mold. In FIG. 11 and FIG. 12, the injection mold 1100 of a plastic lens barrel structure 1120 with three injection channels 1110 is provided, and each of the injection channels 1110 has a gate 1111. A molding material such as melted plastic material is injected into the injection mold 1100 to obtain the plastic lens barrel 200. Thus, the plastic lens barrel 200 has its own structure as described in the 2nd embodiment. Specifically, the molding material is injected into the injection mold 1100 through the three injection channels 1110 to obtain the plastic lens barrel 200. Thus, the plastic lens barrel 200 has the three gate vestiges 240 formed thereon and each of the gate vestiges 240 corresponds to each of the injection channels 1110. The method may be used for manufacturing the plastic lens barrels as described in the 1st embodiment as well as the 3rd to the 9th embodiments.

Although the present disclosure has been described in considerable detail with reference to certain embodiments thereof, other embodiments are possible. Therefore, their spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure covers modifications and variations of this invention provided they fall within the scope of the following claims.

What is claimed is:

1. A plastic lens barrel, comprising:
a front portion having a front opening;
a rear portion having a rear opening;
a side portion connecting the front portion and the rear portion; and
at least three gate vestiges formed on the side portion, wherein the gate vestiges are symmetrically formed around a central axis of the plastic lens barrel; wherein an outermost diameter of the plastic lens barrel is Dmax, and the following relationship is satisfied:

$Dmax<10$ mm.

2. The plastic lens barrel of claim 1, wherein the gate vestiges are closer to the front portion than to the rear portion.

3. The plastic lens barrel of claim 2, wherein the side portion comprises a plurality of planar cut surfaces and each of the gate vestiges is formed separately on one of the planar cut surfaces.

4. The plastic lens barrel of claim 2, wherein a height of the plastic lens barrel is Z, the outermost diameter of the plastic lens barrel is Dmax, and the following relationship is satisfied:

$0.3<Z/Dmax<0.8$.

5. The plastic lens barrel of claim 2, wherein a diameter of the front opening is Df, a diameter of the rear opening is Dr, and the following relationship is satisfied:

$0.1<Df/Dr<0.4$.

6. The plastic lens barrel of claim 2, wherein a height of the plastic lens barrel is Z, and the following relationship is satisfied:

$Z<5$ mm.

7. The plastic lens barrel of claim 2, wherein the plastic lens barrel is utilized in mobile devices.

8. The plastic lens barrel of claim 2, wherein a first thickness of the plastic lens barrel near one of the gate vestiges is Tg, a second thickness of the plastic lens barrel near the rear portion is Tr, and the following relationship is satisfied:

$2.0<Tg/Tr<7.5$.

9. The plastic lens barrel of claim 1, wherein the side portion comprises a thread structure thereon.

10. The plastic lens barrel of claim 1, wherein the side portion comprises a plurality of indentations symmetrically formed around the central axis of the plastic lens barrel.

11. The plastic lens barrel of claim 1, wherein diameter of the front opening is Df, a diameter of the rear opening is Dr, and the following relationship is satisfied:

$0.1<Df/Dr<0.5$.

12. The plastic lens barrel of claim 11, wherein the gate vestiges are closer to the front portion than to the rear portion.

13. The plastic lens barrel of claim 11, wherein the side portion comprises a plurality of indentations and the indentations are symmetrically formed on the side portion around a central axis of the plastic lens barrel.

14. The plastic lens barrel of claim 13, wherein a height of the plastic lens barrel is Z, and the following relationship is satisfied:

$Z<5$ mm.

15. The plastic lens barrel of claim 1, wherein the plastic lens barrel is integrally formed.

16. The plastic lens barrel of claim 1, wherein the plastic lens barrel is manufactured by injection molding using an injection mold with at least three injection channels, and each of the gate vestiges corresponds to each of the injection channels.

17. A method for manufacturing a plastic lens barrel by injection molding with a plurality of injection channels, comprising the steps of:
providing an injection mold of a plastic lens barrel structure, wherein the injection mold comprises at least three injection channels; and injecting a molding material into the injection mold through the injection channels to obtain the plastic lens barrel;

wherein the plastic lens barrel comprises a front portion having a front opening, a rear portion having a rear opening, a side portion connecting the front portion and the rear portion, and at least three gate vestiges formed on at least one of the front portion, the rear portion, and the side portion;

wherein each of the gate vestiges corresponds to each of the injection channels, an outermost diameter of the plastic lens barrel is Dmax, a diameter of the front opening is Df, a diameter of the rear opening is Dr, and the following relationships are satisfied:

$D\text{max} < 10 \text{mm}$; and $0.1 < Df/Dr < 0.5$.

18. The method of claim 17, wherein the gate vestiges are symmetrically formed around a central axis of the plastic lens barrel.

19. The method of claim 18, wherein the gate vestiges are formed on the side portion.

20. The method of claim 19, wherein the gate vestiges are closer to the front portion than to the rear portion.

21. The method of claim 20, wherein the side portion comprises a plurality of planar cut surfaces and each of the gate vestiges is formed separately on one of the planar cut surfaces.

22. The method of claim 20, wherein a height of the plastic lens barrel is Z, the outermost diameter of the plastic lens barrel is Dmax, and the following relationships are satisfied:

$0.3 < Z/D\text{max} < 0.8$.

23. The method of claim 20, wherein the diameter of the front opening is Df, the diameter of the rear opening is Dr, and the following relationship is satisfied:

$0.1 < Df/Dr < 0.4$.

24. The method of claim 20, wherein a height of the plastic lens barrel is Z, and the following relationship is satisfied:

$Z < 5 \text{ mm}$.

25. The method of claim 20, wherein a first thickness of the plastic lens barrel near one of the gate vestiges is Tg, a second thickness of the plastic lens barrel near the rear portion is Tr, and the following relationship is satisfied:

$2.0 < Tg/Tr < 7.5$.

26. The method of claim 17, wherein the side portion comprises a plurality of indentations symmetrically formed around a central axis of the plastic lens barrel.

27. The method of claim 26, wherein the side portion comprises a thread structure thereon.

* * * * *